United States Patent
Ronen et al.

(10) Patent No.: US 7,142,651 B2
(45) Date of Patent: Nov. 28, 2006

(54) FRAUD DETECTION IN A DISTRIBUTED TELECOMMUNICATIONS NETWORKS

(75) Inventors: David Ronen, Givat Shmuel (IL); Daniel Adler, Nesher (IL)

(73) Assignee: Ectel Ltd., Petach Tikva (IL)

( * ) Notice: Subject to any disclaimer, the term of this patent is extended or adjusted under 35 U.S.C. 154(b) by 906 days.

(21) Appl. No.: 09/995,792

(22) Filed: Nov. 29, 2001

(65) Prior Publication Data

US 2003/0101357 A1    May 29, 2003

(51) Int. Cl.
  *H04M 15/00*  (2006.01)
  *H04M 17/00*  (2006.01)
(52) U.S. Cl. .................... 379/114.14; 379/127.02; 379/133; 379/145
(58) Field of Classification Search ........ 379/111, 379/112.01, 112.04–112.06, 114.01, 114.14, 379/115.01, 115.02, 120, 126, 127.01, 127.02, 379/133–134, 145, 188, 191
See application file for complete search history.

(56) References Cited

U.S. PATENT DOCUMENTS

| | | | |
|---|---|---|---|
| 5,345,595 A | * | 9/1994 | Johnson et al. ............. 455/410 |
| 5,592,530 A | | 1/1997 | Brockman et al. |
| 6,014,557 A | | 1/2000 | Morton et al. |
| 6,298,123 B1 | * | 10/2001 | Nolting et al. ............. 379/111 |
| 6,385,444 B1 | * | 5/2002 | Peschel et al. ............. 455/405 |
| 6,891,938 B1 | * | 5/2005 | Scott et al. ........... 379/112.06 |

FOREIGN PATENT DOCUMENTS

| | | |
|---|---|---|
| EP | 0714219 A2 | 11/1995 |
| EP | 0805610 A2 | 5/1997 |
| WO | WO 98/39899 A1 | 2/1998 |
| WO | WO 99/13427 A2 | 9/1998 |
| WO | WO 00/67460 A1 | 4/2000 |
| WO | WO 00/25505 A1 | 5/2000 |
| WO | WO 01/43402 A2 | 12/2000 |

* cited by examiner

*Primary Examiner*—Quoc Tran
(74) *Attorney, Agent, or Firm*—Browdy and Neimark, PLLC

(57) ABSTRACT

Methods, apparatuses and systems for detecting a fraud event on a distributed network are disclosed. A fraud event is indicated if data analysis reveals that there is a lack of consistency between elements in the network.

20 Claims, 13 Drawing Sheets

| FIELD | DESCRIPTION | EXAMPLE |
|---|---|---|
| SESSION ID | UNIQUE NUMBER OF THE SESSION | 11534 |
| GATEWAY ID | THE NAME OF THE GATEWAY | gateway.neteyecorp.com |
| CALL ORIGIN | INDICATES THE ORIGIN OF THE CALL | ORIGINATE |
| CALL TYPE | INDICATE CALL TYPE | VoIP |
| CONNECT TIME | THE CONNECT TIME FOR THIS CALL | 18:27:31.072 UTC WED DEC 9 1998 |
| DISCONNECT TIME | THE CAUSE FOR CONNECT OF THE CALL | 18:27:50.070 UTC WED DEC 9 1998 |
| DISCONNECT CAUSE | THE CAUSE FOR DISCONNECT OF THE CALL | 10 |
| REMOTE IP ADDRESS | IP ADDRESS OF THE REMOTE GATEWAY | 10.11.253.8 |

FIG.6

| FIELD | DESCRIPTION | EXAMPLE |
|---|---|---|
| SRCADDR | SOURCE IP ADDRESS | 10.10.248.85 |
| DSTADDR | DESTINATION IP ADDRESS | 10.11.253.15 |
| FIRST | THE TIME OF THE FIRST PACKET OF THE FLOW | 18:27:31.072 UTC WED DEC 9 1998 |
| LAST | THE TIME OF THE LAST PACKET OF THE FLOW | 23:55:52.076 UTC WED DEC 9 1998 |
| DOCTATS | TOTAL NUMBER OF BYTES IN THE PACKETS | 154868 |

FRAUD DETECTION IN A DISTRIBUTED TELECOMMUNICATIONS NETWORKS

FIELD AND BACKGROUND OF THE INVENTION

The present invention relates to fraud detection methods, apparatuses and systems.

One of the goals of a next generation network is to provide a common, unified and flexible service architecture that can support multiple types of services and management applications over multiple types of transport. The main distinguishing feature of a next generation network is the distributed network intelligence (i.e. distributed functions). Distribution of the functions does not necessarily imply physical separation. Functions in the same location are still considered distributed if the functions are independent of one another.

Distributed networks are sometimes represented using the Open System Interconnection "OSI" model which includes seven layers as shown in FIG. 1. A layer generally includes a group of related functions performed in a given level in a hierarchy of groups of related functions. (Refer to www-.webopedia.com; the model according to webopedia is summarized below).

The application layer (layer 7) 102 supports application and end-user processes. Communication partners are identified, quality of service is identified, and constraints on data syntax are identified. Everything at layer 102 is application specific. Layer 102 provides application services for file transfers, e-mail and other network software services.

The presentation layer (layer 6 also known as the syntax layer) 104 provides independence from differences in data representation (e.g. encryption) by translating from application to network format, and vice versa. Layer 104 formats and encrypts data to be sent across network 200, providing freedom from compatibility problems.

The session layer (layer 5) 106 establishes, manages and terminates connections between applications. Layer 106 sets up, coordinates, and terminates conversations, exchanges, and dialogs between the applications at each end. Layer 106 deals with session and connection coordination.

The transport layer (layer 4) 108 provides transparent transfer of data between end systems or hosts, and is responsible for end-to-end recovery and control. Layer 108 ensures complete data transfer.

The network layer (layer 3) 110 provides switching and routing technologies, creating logical paths, known as virtual circuits, for transmitting data from node to node. Routing and forwarding are functions of layer 110 as well as addressing, Internetworking, error handling, congestion control and packet sequencing.

At data link layer (layer 2) 112, data packets are encoded and decoded into bits. Layer 112 furnishes transmission protocol knowledge and management and handles errors in the physical layer 114, flow control and frame synchronization. Layer 112 is divided into two sublayers, the media access control (MAC) layer and the logical link control (LLC) layer. The MAC sublayer controls how a computer on network 200 gains access to the data and permission to transmit the data. The LLC layer controls frame synchronization, flow control and error checking.

Physical layer (layer 1) 114 conveys the bit stream—electrical impulse, light or radio signal—through network 200 at the electrical and mechanical level. Layer 114 provides the hardware means of sending and receiving data on a carrier, including defining cables, cards, and physical aspects.

Refer to FIG. 2 which shows another model of a distributed network 200. Instead of dividing up network 200 based on how network 200 operates (as in the OSI model), the model divides network 200 into functions provided to clients 205, namely access to network 200, transportation along network 200, network services (including management services), and login, authorization and security. These functions are provided by elements 201, i.e. equipment that perform the different functions of network 200. FIG. 2 shows non-limiting examples of some of the more common elements 201 for each function.

The access function is provided by access function elements 214 located in an access part 210 (including one or more access networks). Clients 205 (phone, computer users, etc) connect to network 200 using any of a variety of technologies (for example digital subscriber line "DSL", cable modems, wireless, local multipoint distribution system (LMDS), etc). Access part 210 also provide basic logical definitions in order to initiate the access connection.

The transportation function is provided by transport function elements 216 located mainly in a transport part 230, but sometimes in access part 210 (for example switches between access equipment 205 and edge router 214). The transportation function is concerned with routing the traffic to and/from clients 205 over network 200. Transport part of the network 230 is generally packet based. Transport part 230 may be an international backbone or even a local area network.

Edges 250 (which include edge routers 214 as access elements) are the interfaces between access part 210 and transport part 230.

The network services function are provided by application function elements 218 located in the application part 240 of the networks. Examples of network services include file transfer, database access, etc.

Management functions (for example fault management or provisioning) are provided by management function elements 222 which are located in application part 240 of the network but can provide services to or manage any of parts 210, 230, or 240 (for example collection of information from elements 201 in each of parts 210, 230, and 240).

Login, authorization, and security functions are provided by login, authentication or security function elements 220 located in any of parts 210, 230, or 240.

In order to further clarify the model presented in FIG. 2, network 200 will be also explained in terms of the OSI model. When discussing network parts 210, 230 or 240, or elements 201 of network 200 it should be understood that if a part or element provides the functionality of a certain layer, the part or element also provides the functionality of layers below that layer.

As an example, access part 210 may provide the functionality of data link layer (layer 2) 112; transport part 230 may provide the functionality of data link layer (layer 2) 112, network layer (layer 3) 110 or transport layer (layer 4) 108; and service part 240 may provide the functionality of application layer (layer 7) 102.

As an example, access function elements 214 may provide the functionality of data link layer (layer 2) 112; transport function elements 216 may provide the functionality of network layer (layer 3) 110 or transport layer (layer 4) 108; and application function elements 218 and management function elements 222 may provide the functionality of application layer (layer 7) 102. Depending on the specific element, login, authentication or security function elements may provide the functionality of varying layers In network 200, elements 201 produce data related to network activity. The data produced can be used for different purposes including: network planning, network management, accounting/billing applications etc. For example, in billing applications the data can be used to allow flexible charging mechanisms based on variables such as time-of-day, bandwidth usage, application usage, class of service, etc., or to allow departmental cost allocation within a company.

As an example, assume at least one of transport function elements 216 is a Netflow enabled router, manufactured by Cisco Systems, Inc., headquartered in San Jose, Calif. Router 216 can capture the following IP flow attributes: source IP address, destination IP address, next hop router address input physical interface index, packet count for flow, byte count for flow, start-of-flow time stamp, end-of-flow time stamp, TCP/UDP source port, TCP/UDP destination port, IP protocol, type of service (ToS), TCP flags, source autonomous system number, destination autonomous system number, source subnet mask, and destination subnet mask.

Various attempts have been made to detect fraud in networks. Many of the attempts provide solutions for specific networks such as telephony, wireless etc.

In traditional telephony networks, the intelligence is concentrated in the switches. Each switch holds a subscriber database, performs the routing algorithms, switches voice calls, encodes/decodes the voice channels, provides billing information, alerts and statistics. The switches also provide call detail records (CDRs). In SS7 (Signaling System No. 7) networks, the packet networks that support signaling within the worldwide public switched telephone network, probes may provide CDRs as a substitute or supplement to those provided by the switches. Therefore fraud analysis systems for traditional telephony networks analyze CDRs (call details records) provided by one or more switches with each call described by a single CDR. In SS7 networks, CDRs from both probes and switches are compared in at least one fraud detection system. Note that traditional telephony and telephony with SS7 are examples of networks with concentrated (i.e. non distributed) network intelligence.

WO 0025505 assigned to Intervoice LP, describes fraud detection in a prepaid calling application using a central database.

WO 0067460 assigned to Nortel Networks Ltd., describes how fraud is detected by using profiles to analyze records generated by the telecommunication systems.

EP 0714219 assigned to AT&T, describes how cloning fraud in a cellular/PCS environment is detected on the basis of the time difference between two notification time records having a common identification number.

WO 9913427 assigned to MCI Communications Corp., describes a method of detecting fraud in telecommunication systems (e.g. using calling cards, credit cards, PBX, and cellular phones). The system analyzes records generated by the telecommunication systems using thresholds, profiles, and/or pattern recognition.

U.S. Pat. No. 6,014,557 assigned to BellSouth Intellectual Property Corporation, describes for a wireless network a system of monitoring devices, coupled to existing network or network elements, and adapted to capture certain data regarding user traffic. The captured data is in turn provided to a message processor which collates raw messages received from the data capture devices and produces fraud data.

WO9839899 assigned to McGuire et al, describes how fraud is detected by comparing call information records to thresholds for each call in a telecommunications network.

WO0143402 assigned to MCI describes how fraud is detected in a telephone system by comparing the terminating number of a first call with the originating number of a second call.

EP0805610 assigned to Nokia describes how to detect the use of stolen mobile identification number and electronic serial number information by comparing the last phone number recorded by the radio telephone network with the last phone number recorded in the mobile unit.

U.S. Pat. No. 5,592,530, assigned to Inet, Inc. describes how calling fraud detection is performed by analyzing a composite record from primary and secondary records compiled by monitors on a mated pair of switching nodes in a telephone network There is thus a widely recognized need for, and it would be highly advantageous to have, methods, systems and apparatuses for detecting fraudulent behavior in distributed networks by comparing the consistency of the data from the network elements. As the variety of charging mechanisms for distributed networks grows, the variety of fraud schemes also increases so as to avoid payment or cause the loss of revenues and/or customers.

There is also a need in the art for fraud detection methods, systems and apparatuses for distributed networks supporting a variety of services and access technologies. There is further a need in the art for methods, systems and apparatuses which can compare different types of data (i.e. different identifying fields and/or value fields) and/or data relating to different amounts of network activity from two or more elements in order to detect fraud. In addition, there is a need in the art for methods, systems and apparatuses to develop rules for determining the consistency of the data from the network elements.

SUMMARY OF THE INVENTION

According to the present invention, there is provided a method for detecting a fraud event in a distributed telecommunications network, wherein the distributed network enables performance of at least two functions selected from a non exhaustive list comprising: an access function, a transport function, an application function, a management function and a security function, by respective functional groups of elements and wherein each of the groups comprising at least one element capable of performing operations related to at least the function of said particular functional group and operative to create records on said operations, the method comprising steps of:
  obtaining records data related to at least one telecommunications session and originating from one or more of the elements belonging to at least two said functional groups,
  analyzing the records data thus obtained to determine whether there is a lack of consistency between the records data respectively obtained from said at least two functional groups,
  if the lack of consistency is determined, concluding that there is a fraud event.

The element should be understood as a hardware-software entity; the elements are placed in the network and capable of creating records with respect to operations said elements perform. For example, the following operations belong to the different functional groups: transmitting and receiving voice, fax, data by various media and using various forms (access function), switching, routing (access and/or transport functions, depending on the place in the network), authorization of access (security function), monitoring (management function), etc. More examples of the elements and operations they perform in the frame of the mentioned functional groups will be presented in the detailed description.

It should be mentioned, that one element may be capable of performing functions belonging to more than one different functional groups. For example, such an element may be an integrated "border element" positioned between different network parts. Examples of such elements are access gateways or routers, which are usually capable of creating different records for different functions.

The distributed telecommunications network can be packet-based, though other modifications are possible.

The method, in the step of obtaining the records data, preferably comprises collecting said records data originating from at least two of said elements, wherein each of said elements belongs to a different functional group.

The records data originating from a particular element may comprise at least a portion of original records or a derivative of the original records. For example, the derivative of the original records may be statistically processed original records.

The step of analyzing preferably comprises a sub-step of recognizing and forming, from the obtained records data, of corresponding data respectively associated with said at least two functional groups. The corresponding data thus obtained serves the basis for comparing activity of different elements in the network. In another example, the corresponding data may be formed as statistically processed records data for at least one of said functional groups.

For analyzing the records data, (or recognizing the corresponding data), there may be used at least one identifier field and/or at least one value field, wherein said at least one identifier field is selected from a non-exhausting list comprising data fields for identifying source, destination, IP address, user name, phone number, and said at least one value field is selected from a non-exhausting list comprising data fields for indicating values of login time, connect time, time of first packet of a flow, logout time, disconnect time, time of last packet of a flow, incoming byte count, outgoing byte count, duration, packet count, session count, dollar value, quality of service.

The step of analyzing preferably comprises a sub-step of applying fraud detection rules for determining whether there is a lack of consistency between the corresponding data respectively obtained from said at least two functional groups.

The fraud detection rules may comprise a collection of algorithms for detection various types of fraud and specifying: selection of elements from which the records data is to be obtained, combinations of identifier fields and/or value fields to be used for recognizing the corresponding data, combinations of the identifier fields and/or value fields to be further checked and/or compared in the corresponding data and methods of comparing thereof, errors and/or trigger thresholds to be referred to when making a decision concerning presence of a fraud event.

Some exemplary fraud detection algorithms will be described below.

For example, the method may comprise implementation of a fraud detection algorithm including:

preliminarily selecting two or more specified elements belonging to different functional groups, to obtain the records data from each of said two or more selected elements;
and, upon obtaining the records data, steps of:
determining, in the records data obtained from each of said elements, presence or absence of an expected specified identifier field, and
considering the lack of consistency to take place if said specified expected identifier field is present in the records data obtained from at least one of said two or more elements, while being absent in the records data obtained from at least one of said two or more elements.

According to another version, the method may comprise the preliminary step of selecting two or more particular elements belonging to different functional groups to obtain the records data from each of said two or more selected elements; and, upon obtaining the records data, steps of:
determining, in the records data obtained from each of said two or more elements, presence or absence of a specified value field, and
considering the lack of consistency to take place either if said specified value field is absent in the records data obtained from at least one of said two or more elements, while present in the records data obtained from at least one of them, or if values of the specified value fields respectively associated with said two or more elements do not correspond to one another.

The above-described algorithm can be utilized, for example, for checking amounts of the network activity which is based on a great number of telecommunication sessions. The value field to be checked may be that of the packet count or its statistical derivative. The check may be performed in general for the network or its portion, or can be customized for at least one specified identifier field.

According to yet another version, the method may comprise a preliminary step of selecting two or more particular elements belonging to different functional groups to obtain the records data from each of said two or more selected elements;

and, upon obtaining the records data, steps of
determining, in the records data obtained from each of said at least two functional groups, presence of at least one specified identifier field and at least one specified value field,
considering the lack of consistency to take place if said at least one specified identifier field and/or said at least one specified value field associated with one of said two or more elements do not respectively correspond to that or those associated with another one of said at least two functional groups.

The meaning of the terms "correspondence" or "non-correspondence" with respect to the identifier fields and the value fields depends on details of each particular algorithm incorporated in the fraud detection rules. One identifier field is usually considered to correspond to another identifier field if they both express one and the same type of the identifier fields and one the same identifier, for example both relate to IP addresses and point to one and the same unique IP address. In a cellular network performing an access function, each IMSI number (International Mobile SIM Identifier) has one-to-one correspondence with a particular phone number, so such identifier fields should be considered identical.

One value field is considered to correspond to another value field if they both express one and the same type of the value fields, while values of the fields differ from one another not more than by a predetermined threshold.

Another type of correspondence may be stated for combinations of identifier and/or value fields. For example, one value field can be compared with a sum of two or more other value fields taking into account a predetermined error/threshold; if the threshold is not exceeded, there is a correspondence for this combination of value fields.

In some algorithms, for determining the lack of consistence, a number of non-correspondences are to be detected.

The mentioned and other possible algorithms will be further described with reference to the attached non-limiting drawings.

According to the present invention, there is further provided an apparatus for detecting a fraud event in a distributed telecommunications network comprising two or more different functional groups of elements, the apparatus comprising an analyzer unit capable of analyzing records data related to at least one telecommunications session and originating from one or more elements belonging to said two or more different functional groups, to determine whether there is a lack of consistency between the records data parts respectively associated with said at least two different functional groups, and capable of indicating the fraud event whenever the lack of consistency is determined.

The apparatus preferably comprises an interface unit for collecting the records data related to at least one telecommunications session and originating from one or more elements belonging to said two or more different functional groups.

Further, the apparatus may comprise a pre-processor unit for preparing the records data collected from said interface unit for said analyzer unit. The pre-processing unit may be capable, for example, of recognizing the corresponding data for the respective functional groups from the collected records data, and/or of forming statistically processed information based on the obtained records data. The analyzer unit preferably comprises fraud detection rules installed therein, and in any case—a comparing means for comparing the obtained, or pre-processed records data.

The apparatus may optionally comprise one or more units selected from a non exhausting list comprising an actions unit, an operator panel unit and a rule builder unit. The rule builder unit may form integral part of the analyzer unit; however, it can be a separate unit. The rule builder unit can be used by an operator for creating new rules for fraud detection say, by using a plurality of pre-generated templates.

The fraud detection apparatus may be formed in one computerized block comprising all the above-mentioned units. However, owing to the fact that most of the operative units of the apparatus are based on software products for pre-processing, analyzing and even obtaining the records data via interfaces, the apparatus may be distributed over the network.

According to a further aspect of the invention, there is provided a system for detecting a fraud event in a distributed telecommunications network, wherein the distributed network enables performance of at least two functions selected from a list comprising: an access function, a transport function, an application function, a management function and a security function by respective functional groups of elements; the system comprising at least two different said functional groups each comprising at least one element capable of performing operations related to at least the function of said particular functional group and operative to create records on said operations, a fraud detection apparatus capable of analyzing records data related to at least one telecommunications session and originating from one or more of the elements belonging to said at least two functional groups to determine whether there is a lack of consistency between the records data parts respectively obtained from said at least two functional groups, and concluding that there is a fraud event if the lack of consistency is determined.

In accordance with yet another aspect of the invention, there is also provided a program storage device readable by a machine, tangibly embodying a program of instructions executable by the machine to perform method steps, for detecting a fraud event in a distributed telecommunications network, wherein said steps being:

analyzing records data related to at least one telecommunications session and originating from one or more elements belonging to at least two functional groups to determine whether there is a lack of consistency between the records data parts respectively associated to said at least two functional groups, if the lack of consistency is determined, concluding that there is a fraud event.

Also, there is provided a computer program product comprising a computer useable medium having computer readable program code embodied therein for detecting a fraud event in a distributed telecommunications network, the computer program product comprising:

a computer readable program code for causing the computer to analyze records data related to at least one telecommunications session and originating from one or more elements belonging to at least two functional groups to determine whether there is a lack of consistency between the records data parts respectively associated to said at least two functional groups, a computer readable program code for causing the computer, if the lack of consistency is determined, to conclude that there is a fraud event.

BRIEF DESCRIPTION OF THE DRAWINGS

The invention is herein described, by way of example only, with reference to the accompanying drawings, wherein:

FIG. 6 is table of a partial VoIP gateway record for the network of FIG. 5, according to a preferred embodiment of the present invention;

DESCRIPTION OF THE PREFERRED EMBODIMENTS

The present invention is of fraud detection systems, apparatuses and methods for distributed networks. Specifically, the present invention can be used to detect fraud when there is a lack of consistent data from at least two elements.

Fraud can be defined as the intentional perversion of truth in order to induce another to part with something of value. In networks, the "something of value" can be, for example, compensation for enabling usage of the network. Fraud therefore includes schemes which cause financial loss. Examples of fraud include schemes to avoid partial or full payment for network use, and denial of service, service abuse, and/or harmful network usage which lead to loss of revenues and/or customers.

It should be evident that although the term fraud detection is used above and below, in reality what is detected is a fraud event. The fraud event indicates a likelihood of fraud. The extent of the likelihood may vary depending on the desired sensitivity of the fraud apparatus.

The principles and operation of fraud detection according to the present invention may be better understood with reference to the drawings and the accompanying description.

Figure 3:
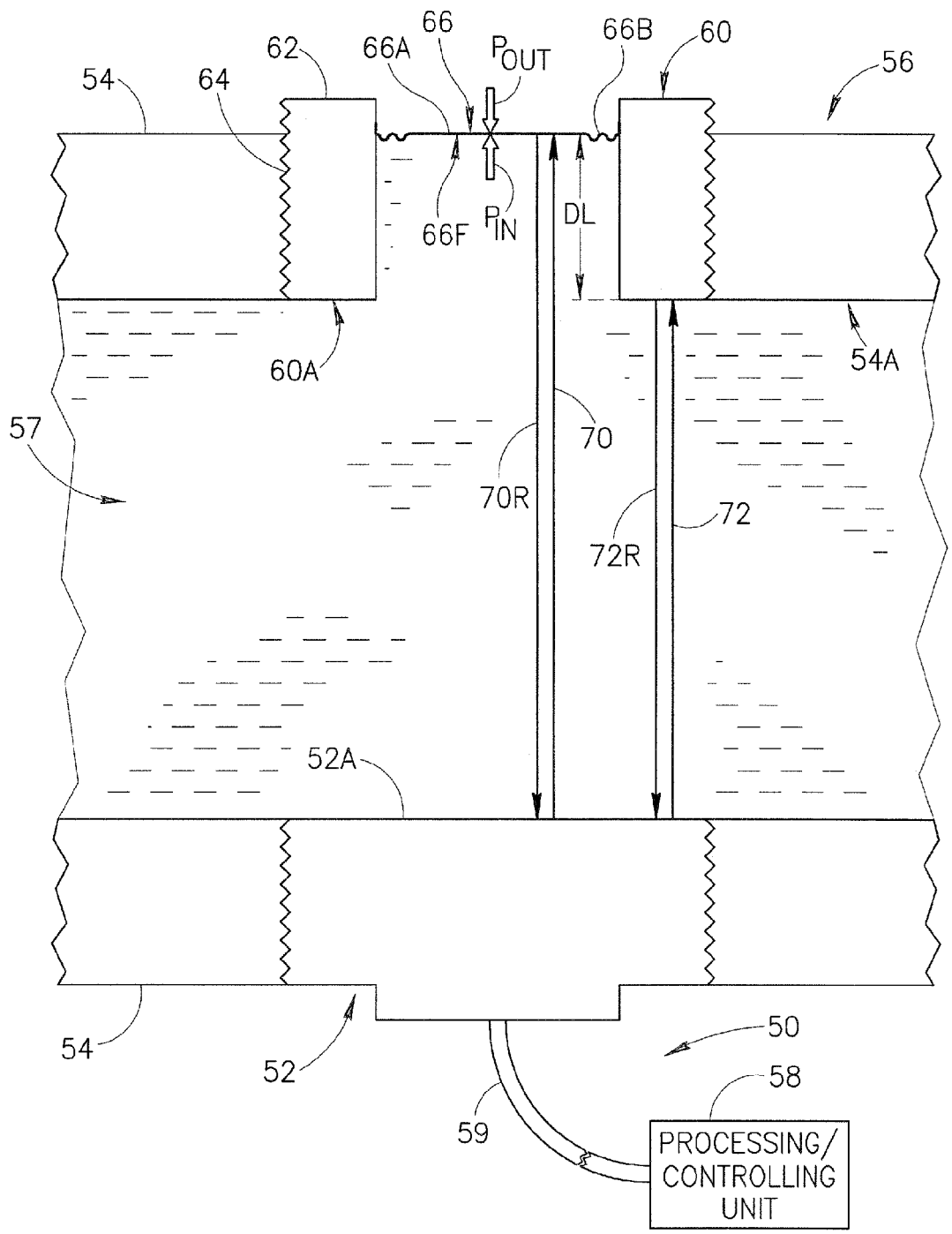
FIG. 3 is a diagram of a distributed network, according to a preferred embodiment of the present invention.

Referring now to the drawings, FIG. 3 illustrates a distributed network 300, according to a preferred embodiment of the current invention. Network 300, as in prior art network 200, includes access part 210, transport part 230, and service part 240. Network 300 is differentiated from network 200 so as to allow fraud detection according to the present invention. In certain preferred embodiments, network 300 is packet based.

Figure 1:
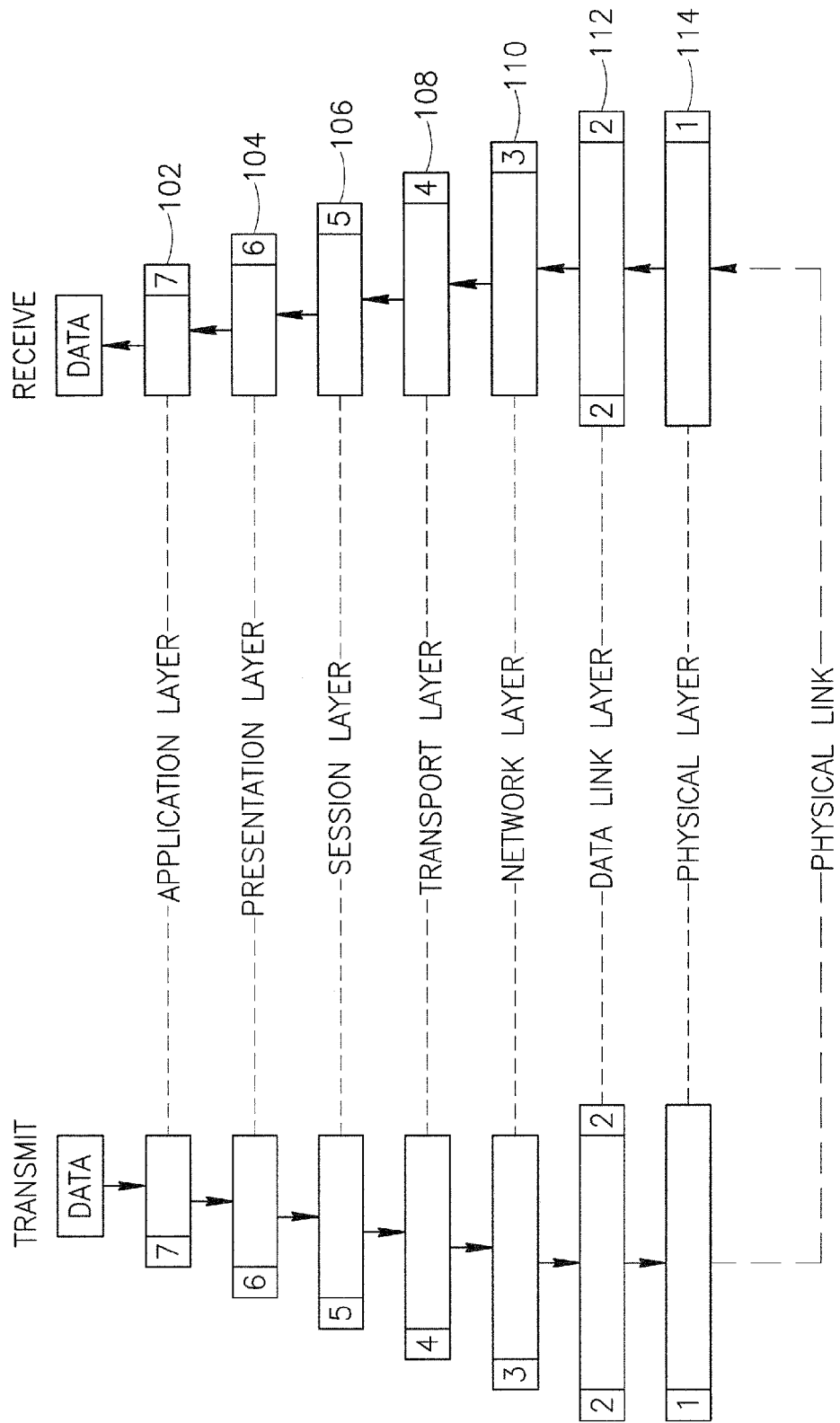
FIG. 1 is a prior art graphic illustration of the seven layers of OSI.
Figure 2:
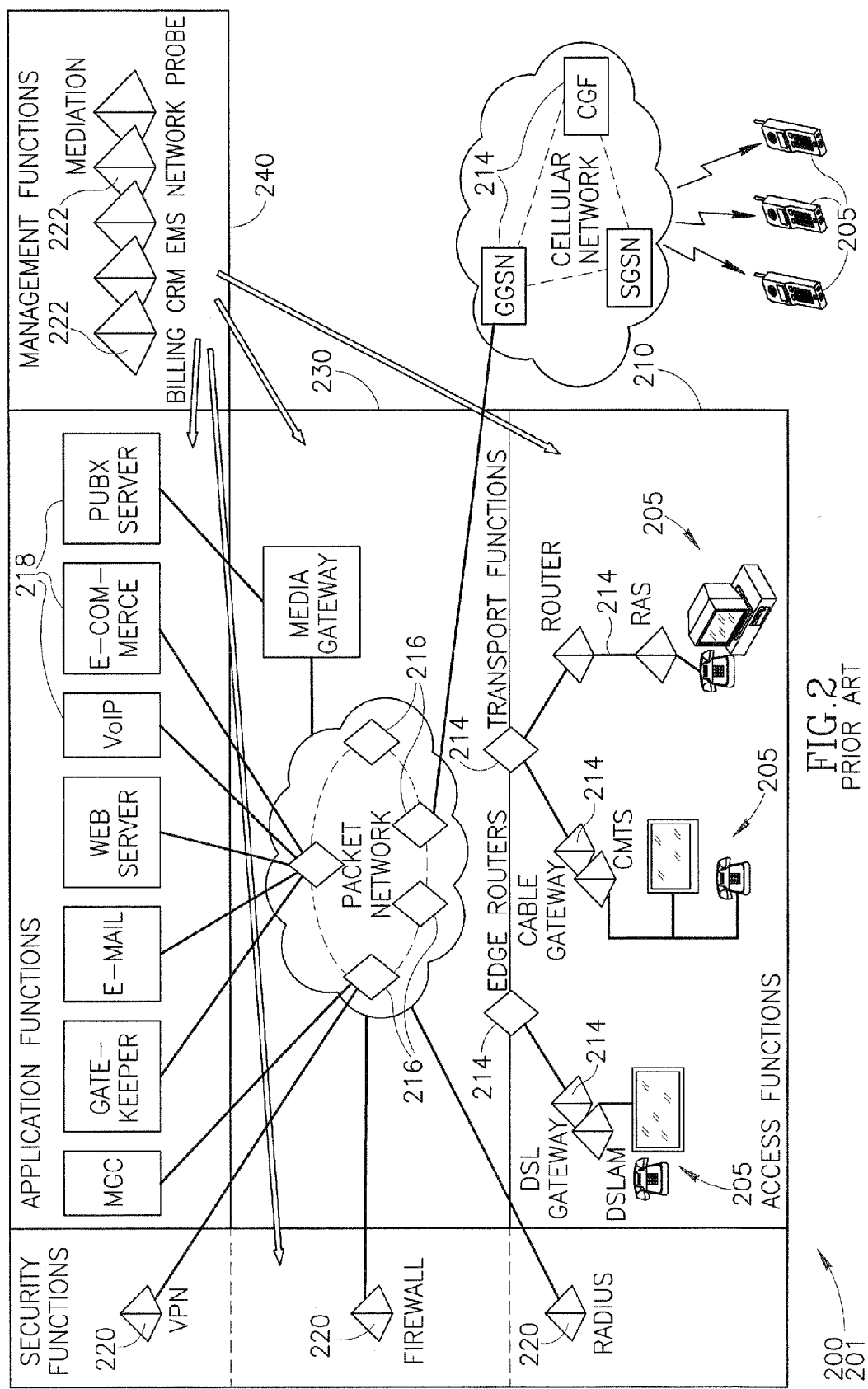
FIG. 2 is a prior art graphic illustration of a distributed network.

Elements 314, 316, 318, 320, and 322 (separately or collectively elements 301) perform the same functions as elements 214, 216, 218, 220, and 222 (separately or collectively elements 201 of FIG. 2) but are differentiated in number so as to also include elements some of which are reconfigured or added for the present invention. Depending on the preferred embodiment, the fraud detection of the current invention can use some or all of the following data: data produced by element(s) 301 during the course of regular operation, (i.e. data which is in any event produced for other purposes such as accounting and therefore no changes are necessary to elements 201 to give elements 301); extra data produced by element(s) 301 for fraud detection (i.e. so as to generate certain additional or substitute data, elements 201 are reconfigured to give elements 301); data produced by elements 301 added in network 300 in order to produce fraud detection data.

For each of the functional groups, non limiting examples are presented below, some of which are also shown in FIG. 3.

Non limiting examples of access function elements 314 include: access, edge routers, cable modem termination system (CMTS), Cable Network gateway, Ethernet links, digital subscriber line access multiplexer (DSLAM), digital subscriber line (DSL) network gateway, Service selection Gateway, remote access server (RAS), Serving general packet radio services support node (SGSN), gateway general packet radio services support node (GGSN), Charging gateway functionality (CGF), Base Station System, and IP/ATM (Internet protocol/asynchronous transfer mode) concentrator or switch. Note that SGSN, GGSN, and CGF are only considered access functional elements 314 in the context of this invention.

Non-limiting examples of transport function elements 316 include: router (also known as core router), switch (including copper based, optical, Internet protocol (IP), asynchronous transfer mode (ATM), etc.), Cross-Connect, and Media Gateway.

Non-limiting examples of application function elements 318 include Media Gateway Controller (MGC), Voice over IP (VoIP) Platform, Public branch exchange (PUBX,) Subscriber owned telecommunications exchange (PBX). Gate-Keeper, VoIP Gateway, e-Mail Server, e-Commerce, m-Commerce, web server, and electronic-Payment Platform.

Non limiting examples of login, authentication or security function elements 320 include: RADIUS (Remote Authentication Dial-In User Service) Server, point to point protocol over Ethernet (PPPoE) Server, Firewall, virtual private network (VPN) Gateway, and probes.

Non limiting examples of management function elements 322 include: Probes, element management system (EMS), Billing System, customer relationship management (CRM), and Mediation.

It should be evident that a larger or smaller number of functional groups can be used instead. For example, the login, authentication and security function group can be in another preferred embodiment, divided into two or more separate functional groups. As another example, the management functions group can be incorporated into the application functions group. It should also be evident that for other preferred embodiments, different functional groupings can be used based on the configuration and purpose of a particular distributed network 300.

It should also be noted that in some preferred embodiments, distributed network 300 does not include all parts shown in FIG. 3, i.e. does not include all of access part 210, transport part 230, and service part 240. For example, a distributed network 300 may not require access part 210, if clients 205 are always directly connected to transport part 230 and therefore no connection needs to be negotiated (see for example the VoIP network of FIG. 5). It should also be evident that based on the configuration of a particular distributed network 300, more and/or different parts can be included.

Network 300 is in communication with a fraud detection apparatus 400. Although, fraud detection apparatus 400 could in some contexts also be considered an "element" of network 200, hereinbelow, the term "element" specifically excludes fraud apparatus 400 in order to more simply explain the invention.

Fraud apparatus 400 is used to detect a fraud event on network 300. As a simple non-limiting example, assume a particular fraud involves counterfeiting an IP address. Also assume that two elements 301 describe a particular network activity with a first element 301 identifying the activity by the IP address identifier and a second element 301 identifying the activity by another identifier. Assume that the second element 301 which is not affected by the fraud due to the usage of an identifier other than IP address, records the correct connect and disconnect times of the particular network activity which for the sake of example are 1PM and 2PM, respectively. Assume also that based on the rule for the network configuration of this example, the first element 301 should record for the particular network activity a time of the first packet of the flow after the connect time of 1PM and a time of the last packet of the flow before the disconnect time of 2PM. Due to the counterfeit IP address, however, the first element 301 records for the particular network activity a time of first packet of the flow before the connect time (for example at 12.50AM) and/or a time of last packet of the flow after the disconnect time (for example at 2.10PM). Fraud apparatus 400, compares the times recorded by first and second elements 301, and detects a fraud event because the earlier time of the first packet of the flow and/or later time of the last packet of the flow violates the rule. Other examples to further illustrate the invention will be provided below.

Figure 4:
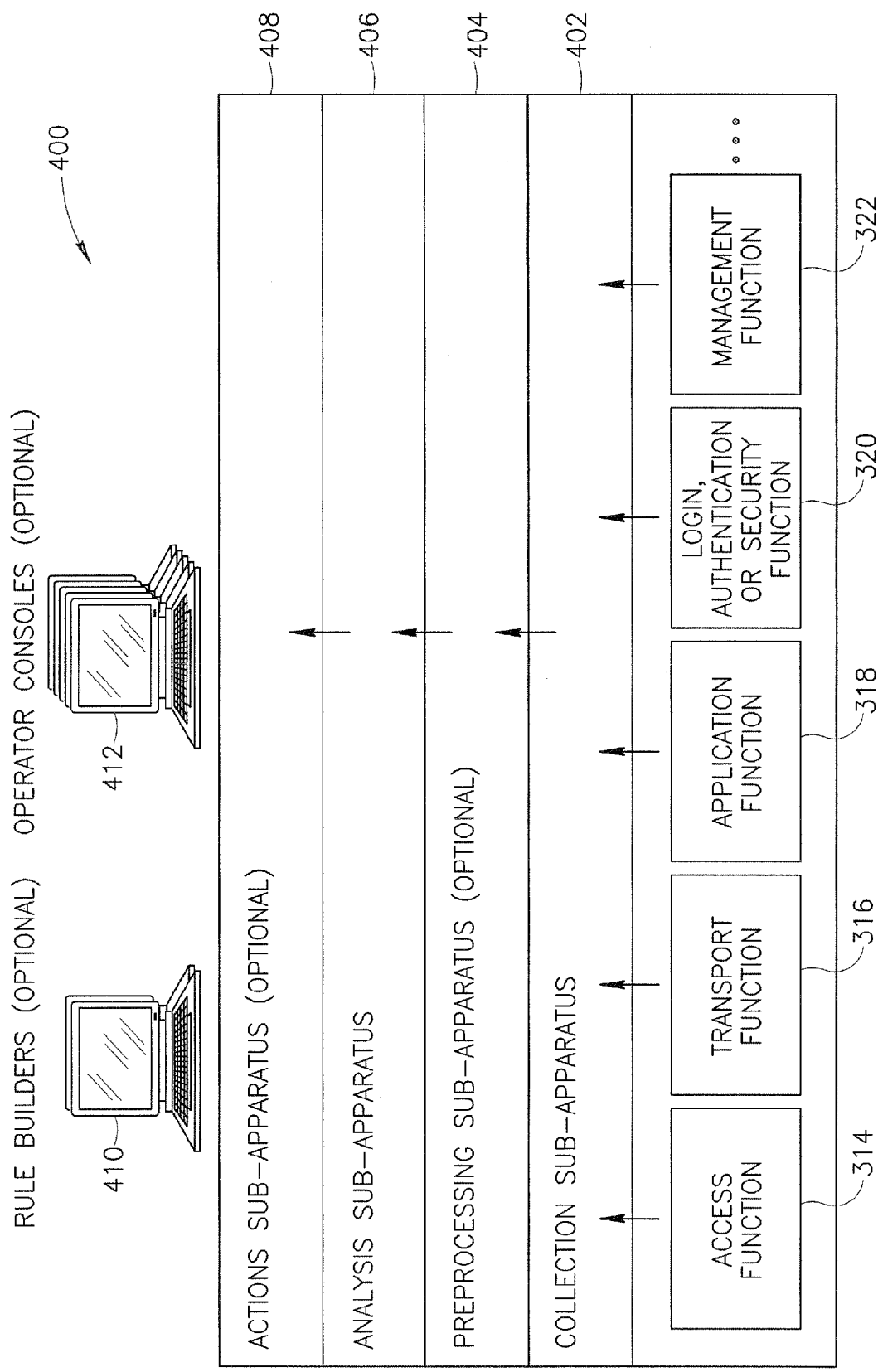
FIG. 4 is a block diagram of the modules constituting a fraud detection system, according to a preferred embodiment of the present invention.

Refer to FIG. 4, which shows a fraud detection apparatus 400 according to a preferred embodiment of the current invention. For convenience, different operations of fraud apparatus 400 are assumed to be performed by separate sub-apparatuses. It should be evident, however, that in other preferred embodiments, more operations can be performed by each of a smaller number of sub-apparatuses, or fewer operations can be performed by each of a larger number of sub-apparatuses. It should also be evident that other implementations and architectures, different from what is shown in FIG. 4 may be used for fraud apparatus 400, and if desired additional operations not described with reference to FIG. 4 may be performed.

Collection sub-apparatus 402 receives data originating from at least two network elements 301 on network 300. Note that the data need not be received directly from the originating network elements 301 but may have passed through other points prior to receipt. The received data is optionally transferred to pre-processing sub-apparatus 404. The data is then transferred to analysis sub-apparatus 406. Analysis sub-apparatus 406 holds fraud detection rules (including rules that are or are not algorithms). If there is a fraud event, action is optionally taken by action sub-apparatus 408.

For the purposes of the analysis by analysis sub-apparatus 406 in order to detect if there is a lack of consistency and a fraud event, it is not really important how the data for analysis is provided to sub-apparatus 406. However, to enhance understanding a discussion of the production and receiving of the data according to a preferred embodiment of the invention is presented below.

As mentioned above, elements 301 produce data related to network activity. In general, not all elements 301 produce data related to the same network activity. For example, if a particular client 205 accesses network 300 through a particular access technology (for example cable access) only some or all of those access elements 314 in the cable access part 210 will record data related to the network activity, while access elements 314 used in other access technologies will generally not record data related to the activity. Continuing with the example, if the requested services for particular client 205 are web-browsing and email, then email server 318 and web server 318 will record data related to the network activity while other non-related application elements will not.

In addition, for any given network activity, records produced by elements 301 may relate to differing block-sizes of network activity. For example, a single record could relate to the bit block-size if a particular element 301 tracks bits. In other cases, a single record could relate to e.g. a byte block-size, packet block-size, frame block-size, flow block-size, session block-size, or user connection period. In other non-limiting cases, a single record could relate to a block-size of traffic carried over the duration of a certain amount of time or any other block-size. For example, a particular element 301 may produce records relating to traffic carried over durations of ten minutes each.

It should also be evident, that for any given block-size of activity, not all elements 301 recording at that block-size necessarily record the same block of network activity. For example, assume that during a single access to network 300 through a particular access element 314, client 205 accesses more than one service (and therefore more than one particular application element 318), and that particular access element 314 and particular application elements 318 all produce records at the session block-size. The record produced by particular access element 314 generally relates to a session whose beginning and end are associated with the earliest beginning and latest end of any of the sessions of particular application elements 318. As another example, a data flow through a first element 301 may later be separated into more than one data flow, each of which flows through separate later elements 301 so that the record produced by first element 301 relating to the data flow will relate to a larger data flow than the records produced by later elements 301.

The data produced by elements 301 can include one or more identifying fields (identifiers) and/or one or more value fields. Examples of identifying fields include source, destination, IP address, user name, phone number, layer 2 address etc. Examples of value fields include number of bytes transferred, connect/disconnect time, login/logout time, time of first/last packet of flow, duration of network activity, dollar value of network activity, bandwidth, quality of service such as delay time and packet loss, etc.

Even when more than one element 301 record data on the same or part of the same network activity at the same block-size, the value fields within the records may differ. Different elements 301 may focus on one or more aspects of the network activity, thereby producing different value fields. Depending on the preferred embodiment, elements in different functional groups 314, 316, 318, 320, and 322, may produce different value fields for the same network activity, the same value fields for the same network activity, or a combination. In some preferred embodiments even within a functional group, elements 301 may produce different value fields.

In most cases, the network elements 301 from which the data is received and compared belong to at least two functional groups 314, 316, 318, 320, and 322, and/or belong to at least two parts 210, 230, and 240 of network 300. However in certain cases, the data is received from at least two different elements 301 in the same functional group and the same part of network 300. For example, data from a media gateway and a switch (both transport elements in transport part 230) can be received and compared. In this case, data from both elements 301 concern the same traffic. In other cases, all elements are "identical" elements, i.e. the same elements in the same functional group and in the same network part (and if all the identical elements are in access part 210 then all are also functioning for the same access technology), for example two routers in transport part 230.

Not all data produced by elements 301 is necessarily transferred to fraud apparatus 400. For example, filtering of the data may occur at some elements 301.

In some preferred embodiments, the receiving of the data by collection sub-apparatus 402 may occur even when there is no suspicion of fraud, i.e. data produced by one or more elements 301 is transferred to collection sub-apparatus 402. In these preferred embodiments, data may be received from elements 301 on a routine basis or on a random basis. The routine basis can be continuous (i.e. soon after the data is produced by an element 301, at least part of the data is transferred), scheduled (for example, at least some data on every $10^{th}$ session is transferred, once an hour at least some data is transferred, etc.) or subject to certain criteria (for example any network activity that is of a long duration is transferred, etc). In other preferred embodiments, data is received by collection sub-apparatus 402 from one or more elements 301 when fraud is suspected and upon request, for example if tampering of a specific element 301 or group of elements 301 is suspected, or if a specific user complains of fraud.

In some preferred embodiments, pre-processing by pre-processing sub-apparatus 404 of some or all of the received data is required or desirable to prepare the data for analysis. For example, sub-apparatus 404 can perform filtering to remove data not needed for analysis. As an example, data in more than one record may be aggregated so that the analysis is more statistical in nature. (The aggregation of data may have in some cases been already performed by one or more elements 301 prior to transfer). Other pre-processing performed by sub-apparatus 404 can include parsing the data, reformatting the data etc. It should be evident that any processing discussed above with reference to pre-processing sub-apparatus 404 could also be performed by analysis sub-apparatus 406 either before or during the analysis process.

Data, once further processed is considered for the purposes of the discussion below, as a derivative of the original data. For example, if the received data is aggregated into statistics, the statistics are considered a derivative of the received data.

Analysis sub-apparatus 406 compares at least part of the data received from elements 301 or derivatives of the received data to determine if there is consistency between corresponding data. The data is compared using one or more fraud rules (which may or may not include algorithms). The rules relate to consistency of data produced by elements 301.

In certain preferred embodiments, the rules incorporate some or all of the following aspects:

One aspect relates to cross referencing of elements 301, i.e. for which two or more elements 301 should corresponding data be sought and compared. In certain preferred embodiments, the cross referencing of elements 301 is closely related to billing so that the emphasis is on detecting fraud that will affect billing. For example, if billing is performed on an hourly basis, elements 301 which produce data relating to time duration are cross-referenced. In certain preferred embodiments, elements 301 are cross-referenced based on the position of those elements 301 in network 300.

Another aspect relates to how corresponding data from elements 301 is identified (i.e. recognized). Data is identifiable e.g. by the identifying fields (identifiers). In some preferred embodiments corresponding data from different elements 301 have the same identifying fields for example the same IP address, user name, phone number, layer 2 address. In other preferred embodiments, corresponding data is identified by matching the different identifiers used by elements 301, for example an IP address and a phone number may be matched if they both identify the same user and/or network activity. The matching may in some cases be facilitated by the use of a database. In some preferred embodiments, corresponding data is sought only among data from cross referenced elements 301, and in other preferred embodiments, corresponding data is instead or also sought among data from other elements 301. In some preferred embodiments, the pattern of events are compared for the at least two elements 301 to see if the patterns are consistent.

Another aspect specifies how data relating to different amounts of network activity from different elements 301 are matched. For example, if one element 301 records data for one block-size of network activity, for corresponding scope, data from more than one (lower block-size) record of another element 301 may need to be compiled to perform the comparison. As another example, a record from one element 301 may relate to more network activity (i.e. a larger block) than records of other elements 301, even though they all record at the same block-size. Refer to the example above of a user accessing more than one service during a single access to network 300. In this case, compilation of records from more than one other element 301 may be necessary in order to perform the comparison.

Another aspect specifies how many and which value fields should be compared for the corresponding data. Value fields can be chosen to be compared for example because the same fields exist for the different elements 301. As another example, different value fields may be chosen to be cross-referenced because these different value fields have a certain relationship in a particular embodiment, for example login time and time of first packet in an IP flow may be chosen if in a particular network configuration, login time, recorded by one element, is required to precede time of first packet in an IP flow, recorded by another element. In some preferred embodiments, the choice of value fields relate to billing methods (i.e. if billing is on an hourly basis, check time field).

Preferably the rules specify the required relationship between the value fields of corresponding data. If the relationship is violated, an error can be calculated. For some rules the quantification of the extent of the inconsistency is possible and desirable. For example if a rule states the number of bytes should be approximately the same for certain elements 301 then if the number of bytes is not the same, the difference between the number of bytes for the different elements may be calculated in order to quantify the extent of the inconsistency. For other rules, quantification of the extent of the inconsistency is not possible and/or not desirable. For example if according to a particular rule, the connection time should precede the time of the first packet of the flow (without specifying by how much), there is consistency if the rule holds and inconsistency if the rule is violated.

Another aspect of the rules involves the allowed margin of error for the rules, for example the percentage mismatch, the absolute allowed difference, and/or trigger threshold allowed between corresponding data from elements 301, without being considered fraud. The percentage mismatch allows the value fields from different elements 301 to be inconsistent by a certain allowed percentage (for example 5%) before being considered fraud. The absolute allowed difference allows the value fields from different elements to be different by a certain amount (for example five minutes)

before being considered fraud. The trigger threshold allows a certain number of mismatches between value fields from different elements 301 (for example two value fields are mismatched) before being considered fraud. In some preferred embodiments the allowed percentage, or absolute allowed difference is used when quantification of the extent of the inconsistency is desirable and/or possible and trigger threshold is used when quantification of the extent of the inconsistency is not desirable and/or not possible.

The allowed margin of error may be pre-determined or adaptable with changing network conditions. The allowed margin of error may be uniform or customizable based on type of network, type of suspected fraud, element, user, etc.

It should be noted that in some cases, the rules can be applied in other sub-apparatuses of fraud apparatus 400.

The present invention is not bound by the aforementioned aspects of the rules and accordingly the rules may incorporate other aspects in lieu or in addition to those specified above, all as required and appropriate, depending upon the particular application.

Rule builders 410 are optionally used to develop the fraud rules. In some preferred embodiments, bundled rules are developed and then customized based on network 300. In other preferred embodiments, rules are written for each individual network 300 by interfaces. Rules can be written in interfaces scripts, graphics, hardcoded etc.

Fraud rules are ideally written so as to detect possible fraud schemes. As new fraud schemes are uncovered, more rules may be added or the same rules may be improved.

Action sub-apparatus 408 may optionally cause an action to be taken based on the fraud event. For example, fraud can be reported by telephone, email, phone or can be shown on optional operator consoles 412. Other actions to stop the fraud or prevent continuing fraud or additional fraud may also be performed. Storage of information regarding the fraud may also occur.

Fraud detection apparatus 400 in some preferred embodiments is implemented in a single box and in other preferred embodiments can be distributed across boxes and physical locations. In addition, each of sub-apparatuses 402, 404, 406, and 408 are implemented in some preferred embodiments in a single box, and in other preferred embodiments distributed across boxes and/or physical locations.

Fraud detection apparatus 400 can be located anywhere on network 300, e.g. on access part 210 (including edges 250), transport part 230, or service part 240. Typically fraud detection apparatus 400 is located in a network management center.

In order to better illustrate how fraud detection apparatus 400 functions in network 300, non-limiting examples of different technologies are presented below. It should be evident that other examples are within the scope of the invention. Although each of the examples below concerns a particular configuration of distributed network 300 for a given technology, other configurations and other technologies are of course possible. In addition, each of the technology examples below are used to illustrate one or more specific aspects of the invention, however it should be evident that in most cases, the other technology examples below, with or without minor changes, could equally well illustrate those same specific aspects.

As mentioned above the data received by fraud apparatus 400 from elements 301 may relate to one or more separate records from each element. The data received can also relate to statistics i.e. data aggregated from more than one record.

It should be evident that in most cases statistics and records can be interchanged in the examples with little or no modifications.

Figure 5:
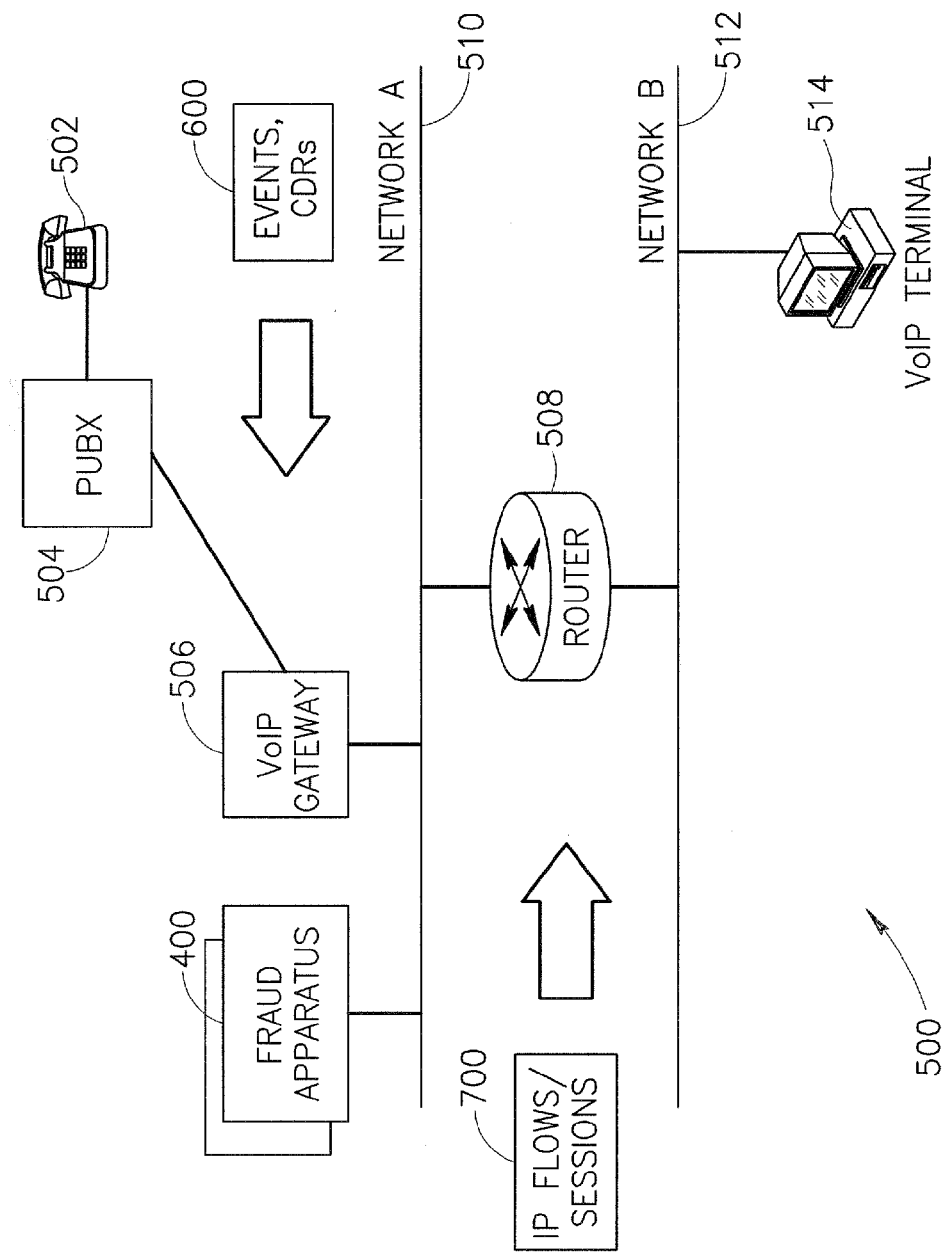
FIG. 5 is a diagram of a Voice over IP ("VoIP") network, according to a preferred embodiment of the present invention.

The first example illustrates how the fraud detection scheme of a preferred embodiment can be used to detect a counterfeit IP address, among other fraud schemes. FIG. 5 illustrates a Voice over IP (VoIP) distributed network 500 with fraud detection capabilities, according to a preferred embodiment of the present invention. A VoIP call is placed between telephone 502 and VoIP terminal 514. The call is routed through public owned telecommunication exchange (PUBX) 504, VoIP gateway 506, and router 508 (interconnecting network A 510 and network B 512). An example of a commercially available VoIP gateway suitable for gateway 506 is Cisco AS5300/Voice, and an example of a commercially available router is Cisco 7200, both manufactured by Cisco Systems, Inc., headquartered in San Jose, Calif. Both VoIP gateway 506 and router 508 generate records 600 and 700, respectively describing the call. Fraud apparatus 400 receives records 600 and 700 and compares relevant fields.

Refer to FIG. 6, which shows some of the fields of a gateway record 600, according to a preferred embodiment of the present invention. Field 610 shows the connect time for the call. Field 612 shows the disconnect time for the call. Field 606 shows the call origin.

Figure 7:
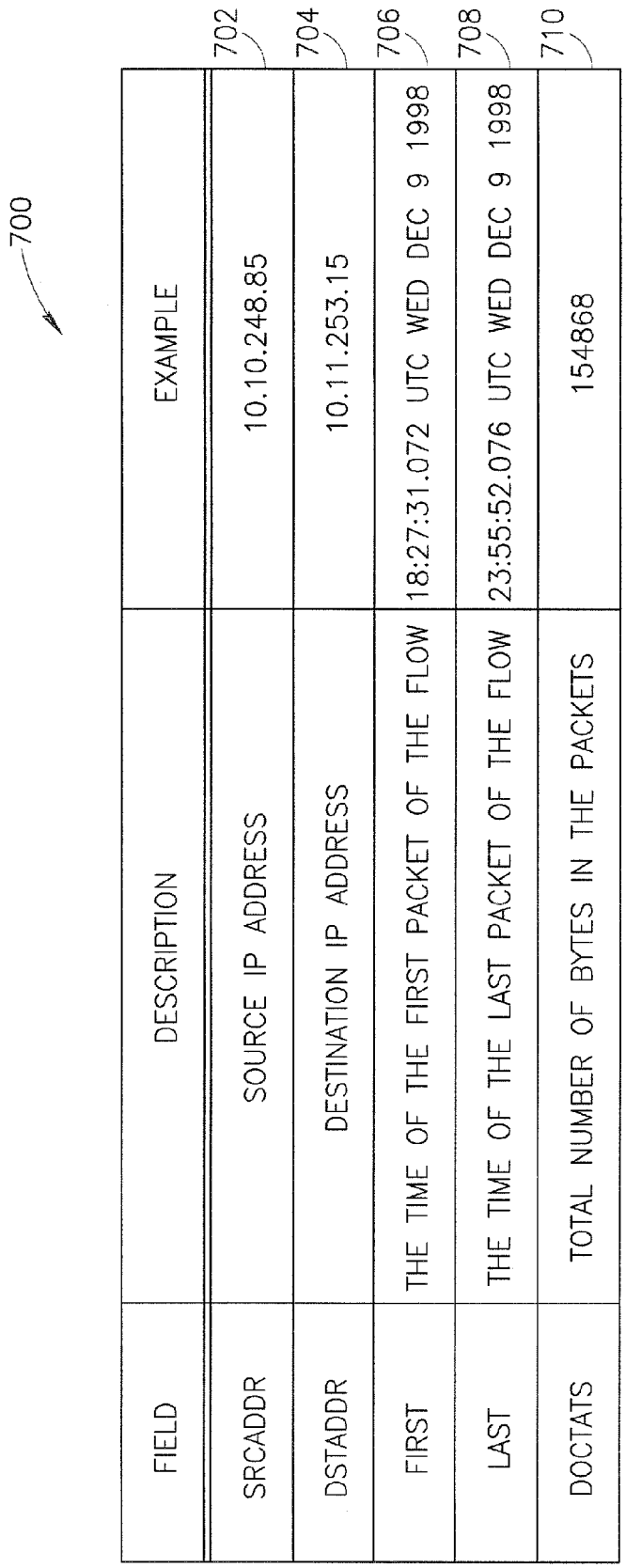
FIG. 7 is a table of a partial router record for the network of FIG. 5, according to a preferred embodiment of the present invention.

Refer to FIG. 7, which shows some of the fields of a router record 700, according to a preferred embodiment of the present invention. Field 706 shows the time of the first packet of the flow. Field 708 show the time of the last packet of the flow. Field 702 shows the source IP address.

In this example multiple records 700 may be produced which correspond to the same call record 600. Fraud apparatus 400 groups records 700 together for the purpose of the analysis. Fraud apparatus 400 identifies record 600 and 700 as being corresponding records by matching the different identifier fields 606 (here call origin) and 702 (here source IP address), perhaps using a database. Fraud apparatus 400 detects a mismatch in the records by comparing time fields 610 (connect time=18:27:31.072) and 612 (disconnect time=18:27:50.070) from VoIP gateway 506 with time fields 706 (time of first packet of the flow=18:15:31.072) and 708 (time of last packet of the flow=23:55:52.076) from router 508. Assuming that based on a rule, time of first packet of the flow is expected to be after the connect time and time of last packet of the flow is expected to be before the disconnect time, a fraud event is recognized. Note that the counterfeit IP address caused the recording of the first packet of the flow to occur before the connect time and recording of the last packet of the flow to occur after the disconnect time. Because in this example gateway 506 uses a different identifying field than IP address, record 600 was not affected by this fraud and the connect and disconnect times were recorded correctly.

In this and other examples, fraud event detection could have depended on other rules. For example, another rule for network 500 could have stated that only if the time of the first packet of the flow is at least fifteen minutes before the connect time, would a fraud event be recognized. In this case, a fraud event would not be recognized in network 500 because the time of the first packet of the flow is only twelve minutes prior to the connect time.

In VoIP network 500, VoIP gateway 506 is an example of an application function element 318 and router 508 is an example of a transport function element 316. Fraud detection schemes in other preferred VoIP embodiments may use e.g. records/statistics from access function elements 314, other transport function elements 316 (for example, media gateways, switches, etc.), other application function elements 318 (for example VoIP platform, Gatekeeper, billing gateway, etc.), login, authentication or security function elements 320, and/or management function elements 322 (for example probe, etc.).

Figure 8:
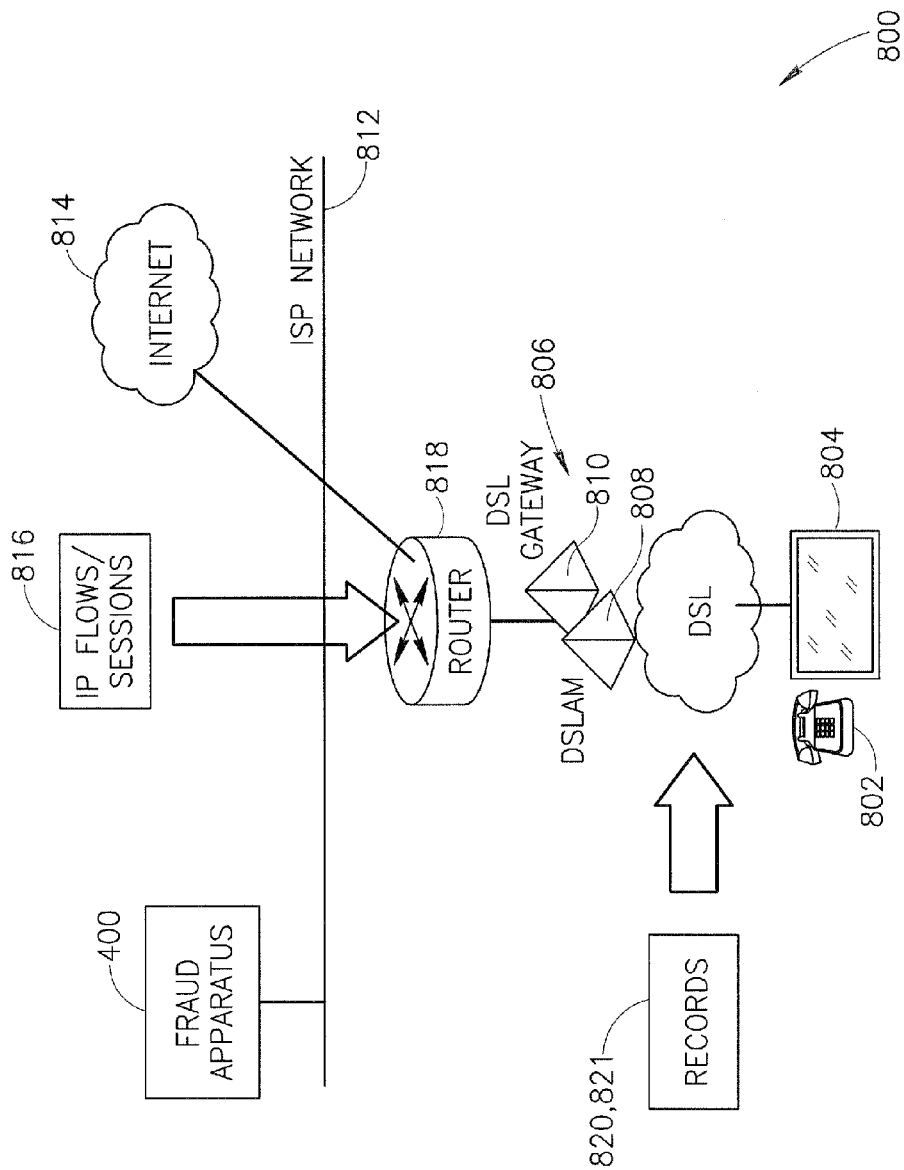
FIG. 8 is a diagram of a Digital Subscriber Line ("DSL") network, according to a preferred embodiment of the present invention.

The second example (FIG. 8) illustrates how the fraud detection scheme of a preferred embodiment can be used to detect tampering with a certain element 301 among other fraud schemes. It is assumed that fraud prevents certain element 301 (in this case a DSL gateway 810) from producing a record of a particular network activity. FIG. 8, illustrates a distributed network 800, according to a preferred embodiment of the present invention. Network 800 includes a digital subscriber line (DSL) access network 806, Internet service provider (ISP) 812 and the Internet 814. Network 800 allows broadband Internet access. DSL access network 806 includes a DSLAM 808 and DSL gateway 810. Internet Protocol (IP) traffic is generated between DSL access equipment such as computer 804 and Internet 814 (or in other embodiments an intranet). DSLAM 808 produces records 820 and DSL gateway 810 generates records 821 based on traffic through DSL access network 806. Router 818 generates IP traffic records 816 describing the IP traffic transferred to and from DSL access equipment 804 and/or phone 802. An example of a commercially available product suitable for DSLAM 808 is Cisco 6260, for DSL gateway 810 Cisco 6400, and for router 818 Cisco 7200, all manufactured by Cisco Systems, Inc., headquartered in San Jose, Calif.

Fraud apparatus 400 receives records 816, 820, and 821 and identifies corresponding records by the identifier (in this embodiment by IP address). In network 800, fraud apparatus 400, for example may detect that there is no corresponding record 821 to record 816 and/or 820 for a certain IP address. Recall that the fraud prevented DSL gateway 810 from producing record 821 for a particular network activity. Note that in this example, a comparison of records 821 with either records 816 or 820 is sufficient to detect a missing corresponding record 821 and therefore identify a fraud event.

It is also possible that for a particular network configuration only one of DSLAM 808 and DSL gateway 810 is expected to produce a record 820 or 821 for a particular network activity. In this case, the comparison would be between records 816 from gateway 810 and records 821 from router 818 to detect the missing corresponding record 821.

DSL gateway 810 and DSLAM 808 are examples of access function elements 314, and router 818 is an example of a transport function element 316 in network 800. Other fraud detection schemes may be used e.g. for DSL networks for voice. Fraud detection schemes in other DSL preferred embodiments (for e.g. voice or broadband Internet access) may use e.g. records/statistics from other access function elements 314 (for example access router/service selection gateway), other transport function elements 316 (for example IP switch, ATM switch), application function elements 318 (for example PUBX), login, authentication or security function elements (for example PPPoE Server, Firewall, VPN Gateway) 320, and/or management function elements 322 (for example Probe, EMS).

Figure 9:
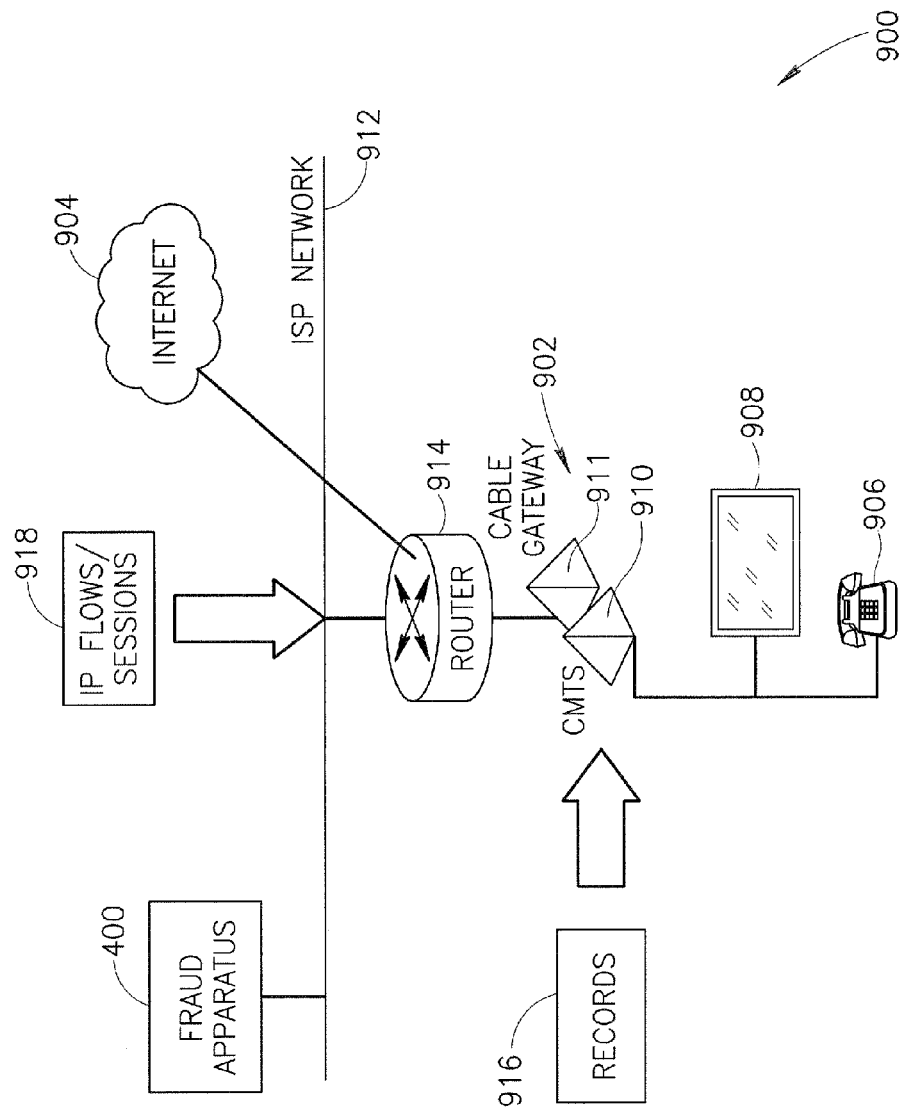
FIG. 9 is a diagram of a Cable network, according to a preferred embodiment of the present invention.

The third example illustrates how the fraud detection scheme of a preferred embodiment can be used to detect tampering with a specific element 301 to lower the number of bytes recorded. FIG. 9, illustrates a distributed network 900 according to a preferred embodiment of the present invention. Network 900 includes a cable access network 902, an ISP 912 and the Internet 904. Cable access network 902 allows Internet access. IP traffic is generated between cable access equipment such as a computer 908 or a phone 906 and Internet 904 (or in some embodiments an intranet). A CMTS 910 generates records 916 based on traffic through cable access network 902. Router 914 generates IP traffic records 918 describing the IP traffic transferred to and from cable access equipment 908 and/or 906. An example of a commercially available product suitable for CMTS 910 is Cisco uBR7200 and an example of a commercially available product suitable for router 914 is Cisco 7200, both manufactured by Cisco Systems, Inc., headquartered in San Jose, Calif. Fraud apparatus 400 receives the records 918 and 916 and compares relevant fields.

In network 900 of FIG. 9, fraud apparatus 400 for example may detect number of bytes mismatch by comparing the incoming and outgoing byte count field from record 916 and the incoming and outgoing byte count field from IP flow record 918, for a given IP user. As an example a rule may state that if there is a discrepancy of over 2% (allowed percentage mismatch) in the incoming or outgoing byte count fields, there is a fraud event. In this case, assuming CMTS 910 was tampered with to lower the byte count by 10% in at least one direction, a fraud event would be recognized.

CMTS 910 is an example of access function elements 314, and router 914 is an example of a transport function element 316 in network 900. Other fraud detection schemes detect fraud in cable networks e.g. which allow video or voice over cables. Fraud detection schemes in other embodiments (e.g. for video, voice over cables or Internet access) may use e.g. records/statistics from other access function elements 314 (for example access router/service selection gateway), other transport function elements 316 (for example switch, media gateway), application function elements 318 (for example media gateway controller, VoIP platform, PUBX, Gatekeeper, e-mail server, e-commerce, m-commerce, and electronic payment platform) login, authentication or security function elements 320 (for example PPPoE Server, Firewall, VPN Gateway, RADIUS server), and/or management function elements 322 (for example Probes).

Figure 10:
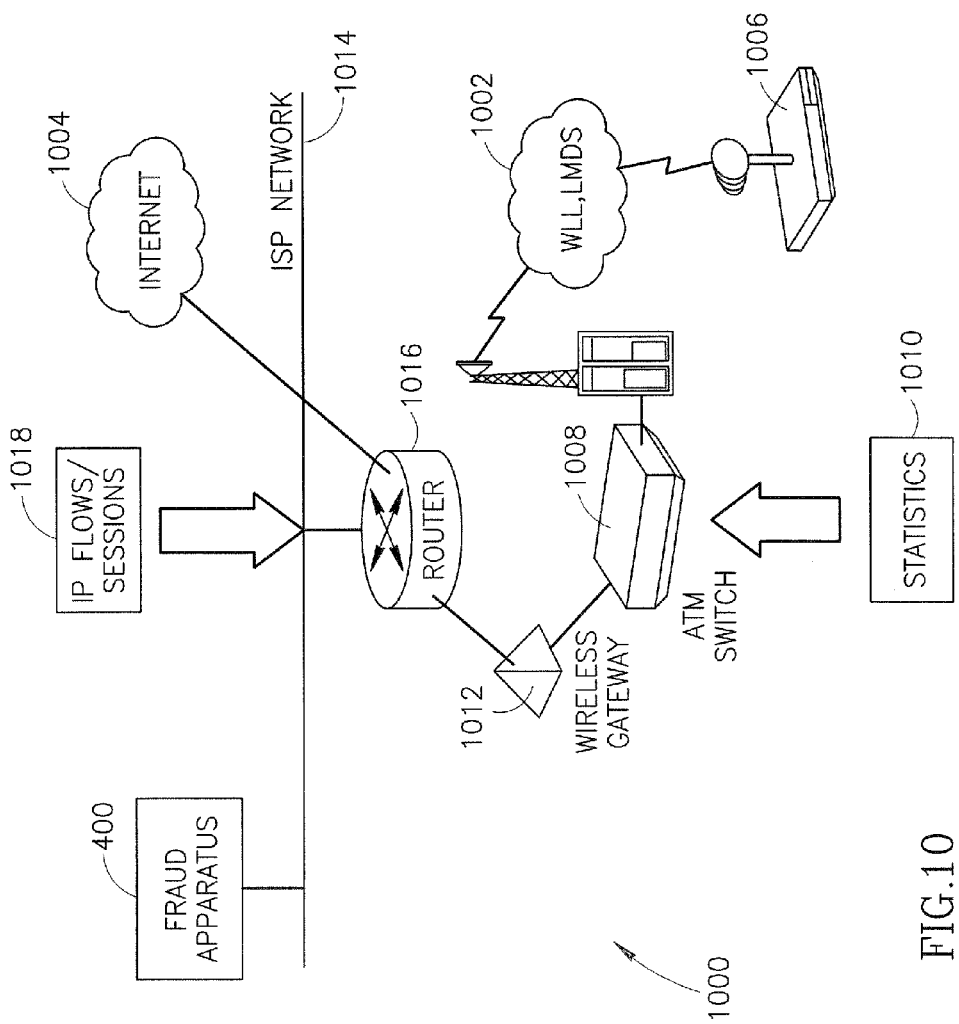
FIG. 10 is a diagram of a Local Multipoint Distribution System network, according to a preferred embodiment of the present invention.

The next example (FIG. 10) illustrates an aspect of the present invention where the comparison of data is performed on statistics related to a series of records. FIG. 10 illustrates a distributed network 1000 according to a preferred embodiment of the present invention. Network 1000 includes a local multipoint distribution system (LMDS) access network 1002, ISP 1014 and the Internet 1004. LMDS access network 1002 allows broadband Internet access. IP traffic is generated between equipment 1006 connected to LMDS access such as a computer or a phone and Internet 1004 (or in some embodiments the intranet). An asynchronous transfer mode "ATM" switch 1008 (which is part of LMDS access network 1002) generate records 1009 (not shown) based on traffic transferred. Switch 1008 also aggregates records 1009 for a given IP user to give statistics 1010. Router 1016 generates IP traffic records 1018 describing the IP traffic transferred to and from LMDS access equipment 1006. An example of a commercially available product suitable for ATM switch 1008 is Lucent Cajun 500 manufactured by Lucent Technologies, headquartered in Murray Hill, N.J. An example of a commercially available product suitable for router 1016 is Cisco 7200, manufactured by Cisco Systems, Inc., headquartered in San Jose, Calif. Fraud apparatus 400 receives the records 1018 and statistics 1010. Assuming it is necessary in order to perform the comparison, fraud apparatus 400 aggregates records 1018 to produce statistics 1019 (not shown) for a given IP user and compares for a given IP user relevant fields in both sets of statistics 1010 and 1019.

In network 1000, fraud apparatus 400 for example may compare the incoming and outgoing byte count field from statistics 1010 received from ATM 1008 on a PVC (a permanent virtual circuit created by ATM 1008) and the incoming and outgoing byte count field in statistics 1019, for a given IP user. Assume the fraud rule allows a percentage mismatch in bytes of 2%. If the comparison yields a percentage difference of only 1%, no fraud event is indicated.

ATM switch 1008 is an example of an access function element 314 and router 1016 is an example of a transport function elements 316 in network 1000. Other fraud detection schemes for LMDS or wireless networks can be used e.g. for voice or data services. Fraud detection schemes in other preferred wireless/LMDS (voice, broadband Internet, or data services) embodiments may use e.g. records/statistics from other access function elements 314 (for example access router, etc.), other transport function elements 316 (for example switch, optical switch, media gateway, etc.), application function elements 318 (for example media gateway controller, VoIP platform, PUBX, Gatekeeper, etc.), login, authentication or security function elements 320 (for example PPPoE Server, Firewall, VPN Gateway), and/or management function elements 322 (for example EMS, etc.).

The next example illustrates how fraud detection according to a preferred embodiment can compare data from two elements 301 both on access network 210. In addition, the example illustrates how the fraud detection scheme of the current invention can be used to detect tampering with a specific element 301 to change the time duration recorded for a network activity.

Figure 11:
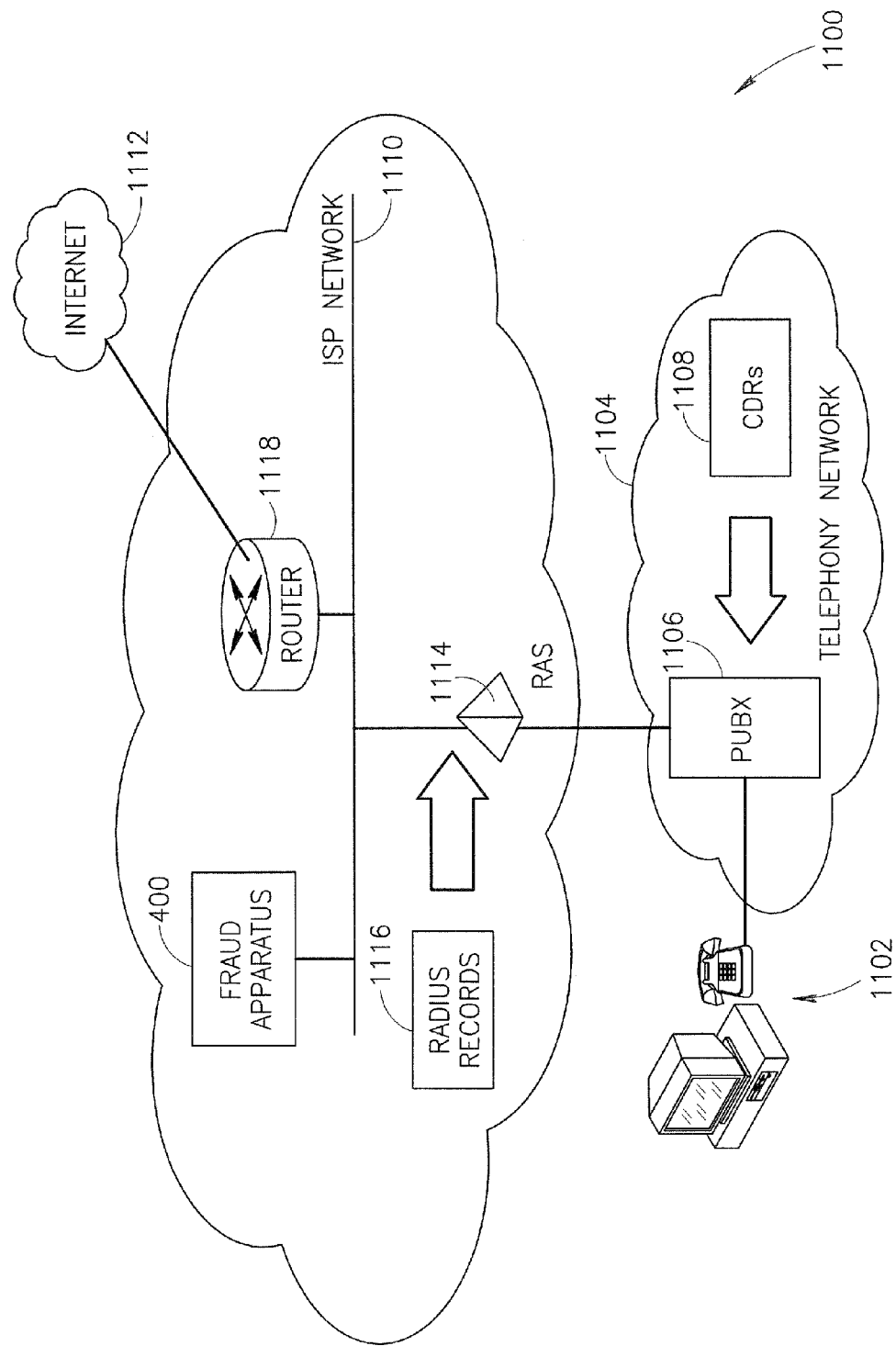
FIG. 11 is a diagram of a Dial Up network through a PUBX, according to a preferred embodiment of the present invention.

In FIG. 11, a dial up distributed network 1100 operating through a PUBX 1106 is shown, according to a preferred embodiment of the present invention. IP traffic is generated between a home computer 1102 and the Internet or intranet 1112 through a telephony network 1104 (the access network) including a voice PUBX 1106 and an ISP network 1110. A remote access server (RAS) 1114 produces RADIUS accounting records 1116 for Internet usage. PUBX 1106 generates CDRs 1108 describing the phone calls. An example of a commercially available product suitable for RAS 1114 is 3Com HiPer ARC, manufactured by 3Com, headquartered in Santa Clara, Calif. An example of a commercially available product suitable for PUBX 1106 is Nortel DMS 100, manufactured by Nortel Networks Corporation, headquartered in Brampton Ontario. Fraud apparatus 400 receives records 1116 and CDRs 1108 and compares corresponding relevant fields, for example for a given IP user.

For example, fraud apparatus 400 may detect duration mismatch by comparing the duration of the call based on the connect and disconnect time fields from CDR 1108 produced by PUBX 1106 and the duration of the internet session based on the login and logout times time fields from a corresponding RADIUS record 1116. The rule checks if the duration for the same IP user match (within the allowed margin of error, assumed here to be one minute). A longer duration of a call in CDR 1108 (for example forty minutes) compared to the duration in corresponding radius record 1116 (for example thirty minutes) indicates a fraud event because the ten minute difference in durations exceeds the allowed one minute margin of error. In this example, probably RAS 1114 was tampered with to lower the time duration (or less likely PUBX 1106 was tampered with to raise the time duration).

In other fraud detection schemes, e.g. records/statistics can be used from other access function elements 314 (for example access router, etc.), transport function elements 316 (for example router, switch, etc.), other application function elements 318 (for example, email server, e-commerce, electronic payment platform, etc.), login, authentication or security function elements 320 (for example radius server, firewall, etc.), and/or management function elements 322 (for example probe, etc).

Figure 12:
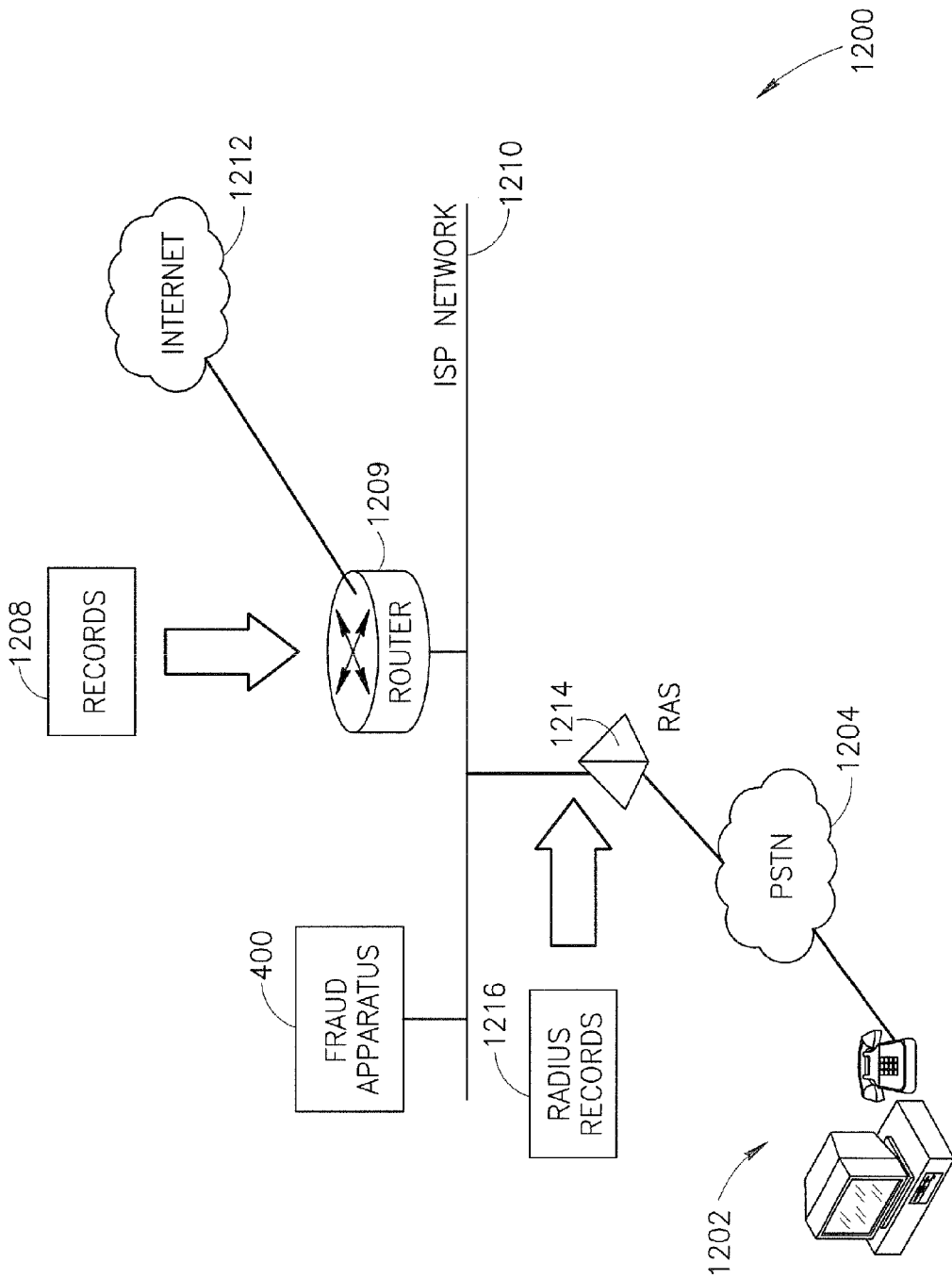
FIG. 12 is a diagram of a Dial Up network, according to a preferred embodiment of the present invention.

Another fraud detection scheme is illustrated in FIG. 12, where a dial up distributed network 1200 according to a preferred embodiment of the present invention is shown. IP traffic is generated between a home computer 1202 through a telephony network 1204 (the access network) and an ISP network 1210 to the Internet 1212 (or intranet). A remote access server (RAS) 1214 produces RADIUS accounting records 1216 describing the network activity. A router/switch 1209 generates records 1208 describing the IP traffic from and to home computer 1202. An example of a commercially available product suitable for RAS 1214 is 3Com HiPer ARC, manufactured by 3Com, headquartered in Santa Clara, Calif. An example of a commercially available product suitable for router 1209 is Cisco 7200, manufactured by Cisco Systems, Inc., headquartered in San Jose, Calif.

Fraud apparatus 400 receives the records 1216 and 1208 and compares corresponding relevant fields. For example, fraud apparatus 400 may compare the incoming and outgoing byte count field from records 1208 received from router 1209 and the incoming and outgoing byte count field produced from record 1216, for the same IP address. Assume that in this case, there are two rules and if either of these rules are violated, a fraud event is detected. If there is a mismatch of over a certain percentage in byte count in either direction (for example the number of bytes for a specific IP address in records 1208 differs from the number of bytes in Radius records 1216 by over a certain percentage), a fraud event is detected. Alternatively, if the number of mismatches exceeds a trigger threshold (for example if the trigger threshold is two mismatched fields and both the incoming and outgoing bytes count fields are mismatched for a specific IP address) fraud apparatus 400 detects a fraud event.

Network 1200, could also represent a leased line. In network 1200, RAS 1214 is an example of an access function element 314 and router 1209 is an example of a transport function element 316. (Router 1209 could alternatively be considered an access router and therefore an access function element 314, in which case network 1200 would be an example of a fraud detection scheme with two different elements 301 from the same functional group and same network part) In other fraud detection schemes, e.g. records/statistics can be used from other access function elements 314 (for example access router, etc.), other transport function elements 316 (for example, switch, etc.), application function elements 318 (for example, email server, e-commerce, m-commerce, and electronic payment platform, etc.), login, authentication or security function elements (for example radius server, firewall, etc.) 320, and/or management function elements 322 (for example probe, etc).

Figure 13:
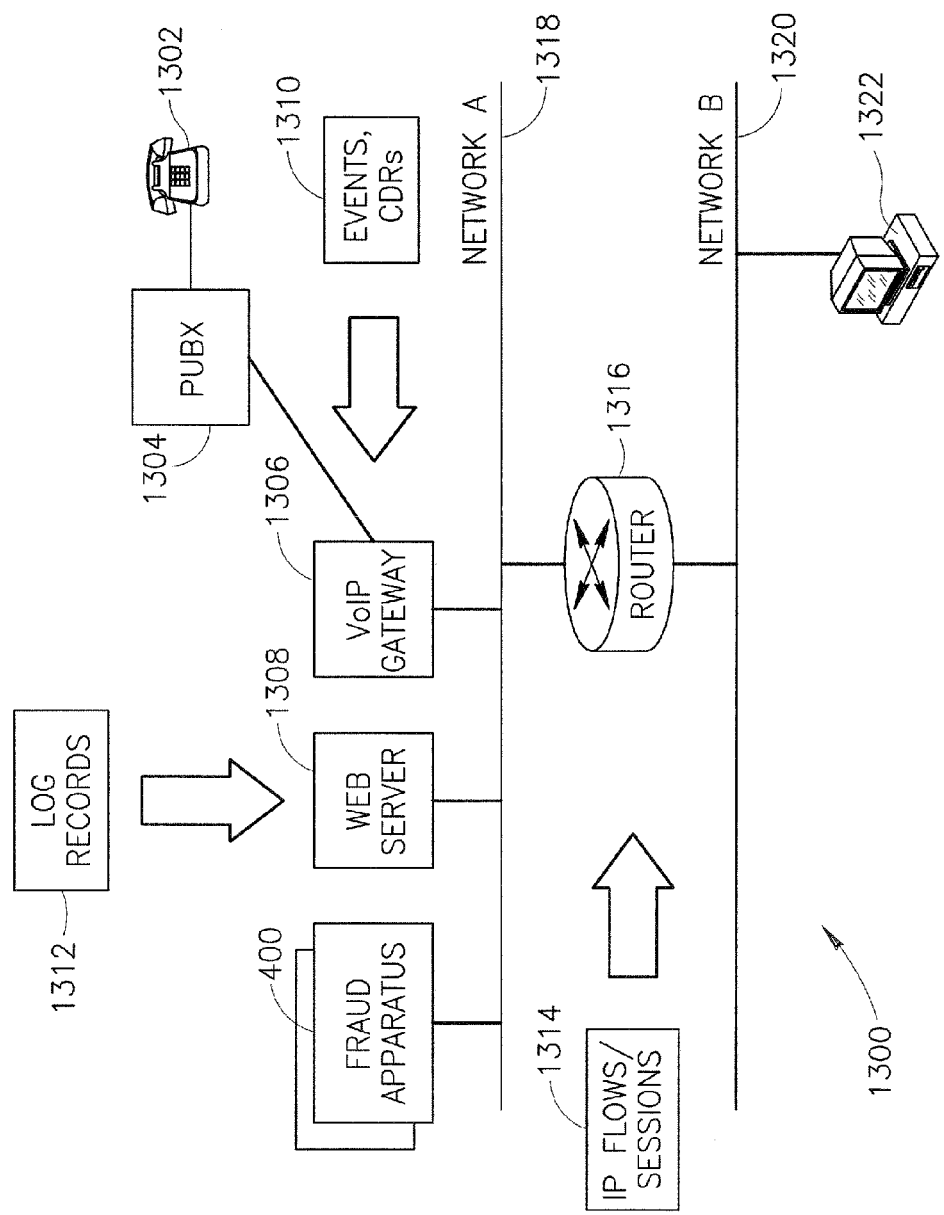
FIG. 13 is a diagram of a VoIP and Web Service network, according to a preferred embodiment of the present invention.

The next example illustrates how the fraud detection scheme of the current invention can detect fraud based on data related to more than one service. In other words the fraud detection of the current invention is adaptable to the multi-service nature of distributed networks. The example also illustrates how different blocks of network activity can be compared. FIG. 13 shows network 1300 providing two services, web-browsing and voice over IP. It should be evident that more than two services could be provided by network 1300 with slight adaptations to the explanations below.

A computer 1322 is used both as a web client and a VoIP terminal. IP traffic is generated between computer 1322 and either web server 1308 or phone 1302, both through router 1316. Router 1316 generates records 1314, web server 1308 generates records 1312 and VoIP gateway 1306 generates records 1310. Assume all three records 1314, 1312, and 1310 are identifiable by IP address. Fraud detection apparatus 400 receives and compares corresponding records 1314, 1312, and 1310 based on fraud detection rules. For example, fraud detection apparatus 400 may compare the number of bytes listed in record 1314 (relating to a larger block of network activity) with the sum of the number of bytes listed in records 1312 and 1310 for both incoming and outgoing directions. Assuming that the rule indicates a fraud event if there is a percentage mismatch of over 2% in each direction between the number of bytes listed in record 1314 and the sum of the of the number of bytes listed in records 1312 and 1310, and the comparison yields a percentage mismatch of 3% in one direction and 4% in the other direction, a fraud event is detected.

In this example, VoIP gateway 1306 and web server 1308 are examples of application function elements 318, each related to a different service (i.e. application). A commercially available product suitable for use as VoIP gateway 1306 is Cisco AS5300/Voice manufactured by Cisco Systems, Inc., headquartered in San Jose, Calif. A commercially available product suitable for use as web server 1308 is Microsoft IIS Server version 5, manufactured by Microsoft Corp., headquartered in Redmond, Wash. Router 1316 is an example of a transport function element 316. A commercially available product suitable for use as router 1316 is Cisco 7200, manufactured by Cisco Systems, Inc., headquartered in San Jose, Calif.

Other networks to which the fraud detection apparatuses of the current invention can be applied are for example video conferencing where e.g. records/statistics can be used from access function elements 314, transport function elements 316 (including media gateways, routers, switches, etc.) application function elements 318 (such as media gateway controllers, etc), login, authentication or security function elements 320, and/or management function elements 322 (such as probes, etc).

Other networks to which the fraud detection apparatuses of the current invention can be applied are for example GPRS/3G Mobile where e.g. records/data can be used from access function elements 314 (including SGSN, GGSN, base station system. etc), transport function elements 316 (including routers, switches, optical switches media gateways, etc), application function elements 318 (such as media gateway controllers, VoIP platforms, PUBX, Gatekeepers, m-commerce, electronic payment platforms, etc), login, authentication or security function elements 320 (including Radius/Diameter server, etc) and/or management function elements 322 (such as CGF. etc).

Other networks to which the fraud detection apparatuses of the current invention can be applied are for example, PPPoE, i.e. broadband Internet access where the access medium can be Ethernet, optical or any other medium. In such networks e.g. records/statistics can be used from access function elements 314 (including access routers, CMTS, Ethernet, switches, DSLAM, etc.), transport function elements 316 (including routers, switches, optical switches, etc), application function elements 318, login, authentication or security function elements 320 (including PPoE server RADIUS server, etc), and/or any management function elements 322.

Other networks to which the fraud detection apparatuses of the current invention can be applied are for example transport provider, i.e. carrier of carriers, including services such as optical switching, dark fibers, IP links, bandwidth on demand, and VPNs. In such networks e.g. records/statistics can be used from access function elements 314 (including access routers, IP switches, ATM switches, etc), transport function elements 316 (including optical switches, cross connects, media gateways, IP switches, ATM switches, etc), application function elements 318, login, authentication or security function elements 320, and/or management function elements 322 (including probes, etc).

It should be noted that the fraud detection methods, apparatuses and systems of the current invention can be implemented as a substitute or as a supplement to other fraud detection methods, apparatuses and systems. In other words, in certain implementations, the described invention provides additional protection against fraud in conjunction with other fraud detection schemes such as those based on detecting changes in user behavior, exceeding of thresholds, etc.

Although the invention has been described for fraud detection, it should be evident that similar methods, systems and apparatuses could be used to detect other types of attempts to use the network improperly without causing financial loss, including security, attempts to break down part or all of the network, and service abuse. The term of "fraud" and "fraud event" should therefore be understood more generally.

It will also be understood that the apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, it will be appreciated that many variations, modifications and other applications of the invention may be made.

The invention claimed is:

1. A method for detecting a fraud event in a distributed telecommunications network, wherein the distributed network enables performance of at least two functions selected from a non exhaustive list comprising: an access function, a transport function, an application function, a management function and a security function, by respective functional groups of elements, at least two of the functional groups having respectively different characteristics, and wherein each of the groups comprises at least one element capable of performing operations related to at least the function of said particular functional group and operative to create records on said operations, the method comprising steps of:
obtaining records data related to at least one telecommunications session and originating from at least two of the elements each belonging to at least a respective one of the at least two functional groups,
analyzing the records data thus obtained to determine whether there is a lack of consistency between the records data respectively obtained from said at least two functional groups and relating to the same at least one telecommunications session, and if the lack of consistency is determined, concluding that there is a fraud event.

2. The method according to claim 1, wherein said distributed telecommunications network is packet-based.

3. The method according to claim 1, wherein the functions are in different network layers, and the step of obtaining the records data is characterized in that said at least two elements from which the records data originates are associated with functions in respectively different network layers.

4. The method according to claim 1, wherein said records data originating from a particular element comprises at least a portion of -original records or a derivative of the original records.

5. The method according to claim 4, wherein the derivative of the original records are statistically processed original records.

6. The method according to claim 1, wherein the step of analyzing comprises a sub-step of recognizing and forming, from the obtained records data, corresponding data respectively associated with said at least two functional groups.

7. The method according to claim 6, comprising using, for recognizing the corresponding data, at least one identifier field and/or at least one value field, wherein said at least one identifier field is selected from a non-exhausting list comprising data fields for identifying source, destination, IP address, user name, phone number, and said at least one value field is selected from a non-exhausting list comprising data fields for indicating values of login time, connect time, time of first packet of a flow, logout time, disconnect time, time of last packet of a flow, incoming byte count, outgoing byte count, duration, packet count, session count, dollar value, quality of service.

8. The method according to claim 7, wherein the step of analyzing comprises a sub-step of applying fraud detection rules for determining whether there is a lack of consistency between the corresponding data respectively obtained from said at least two functional groups.

9. The method according to claim 8, wherein the fraud detection rules comprise a collection of algorithms for detection various types of fraud and specifying: selection of elements from which the records data is to be obtained, combinations of identifier fields and/or value fields to be used for recognizing the corresponding data, combinations of the identifier fields and/or value fields to be further checked and/or compared in the corresponding data and methods of comparing thereof, errors and/or trigger thresholds to be referred to when making a decision concerning presence of a fraud event.

10. The method according to claim 9, wherein the method comprises a preliminary step of selecting two or more particular elements belonging to different functional groups to obtain the records data from each of said two or more selected elements; and
    upon obtaining said records data, performing sub-steps of the analyzing step:
        determining, in the records data obtained from each of said elements, presence or absence of an expected specified identifier field, and
        considering the lack of consistency to take place if said specified expected identifier field is present in the records data obtained from at least one of said two or more elements, while being absent in the records data obtained from at least one of said two or more elements.

11. The method according to claim 9, wherein the method comprises a preliminary step of selecting two or more particular elements belonging to different functional groups to obtain the records data from each of said two or more selected elements; and
    upon obtaining said records data, performing sub-steps of the analyzing step:
        determining, in the records data obtained from each of said two or more elements, presence or absence of a specified value field, and
        considering the lack of consistency to take place either if said specified value field is absent in the records data obtained from at least one of said two or more elements, while present in the records data obtained from at least one of them, or if values of the specified value fields respectively associated with said two or more elements do not correspond to one another.

12. The method according to claim 9, wherein the method comprises a preliminary step of selecting two or more particular elements belonging to different functional groups to obtain the records data from each of said two or more selected elements; and
    upon obtaining said records data, performing sub-steps of the analyzing step:
        determining, in the records data obtained from each of said at least two functional groups, presence of at least one specified identifier field and at least one specified value field; and
        considering the lack of consistency to take place if said at least one specified identifier field and/or said at least one specified value field associated with one of said two or more elements do not respectively correspond to that or those associated with another one of said at least two functional groups.

13. An apparatus for detecting a fraud event in a distributed telecommunications network comprising at least two different functional groups of elements, at least two of the functional groups having respectively different characteristics, the apparatus comprising an analyzer unit capable of analyzing records data related to at least one telecommunications session and originating from at least two elements each belonging to a respective one of said at least two different functional groups, to determine whether there is a lack of consistency between the records data parts respectively associated with said at least two different functional groups and relating to the same at least one telecommunications session, and capable of indicating the fraud event whenever the lack of consistency is determined.

14. The apparatus according to claim 13, further comprising an interface unit for collecting the records data related to at least one telecommunications session and originating from one or more elements belonging to said two or more different functional groups.

15. The apparatus according to claim 13, adapted to cooperate with the distributed network enabling performance of at least two functions selected from a list comprising: an access function, a transport function, an application function, a management function and a security function, by respective said functional groups of the elements and wherein each of the groups comprising at least one element capable of performing operations related to at least the function of said particular functional group and operative to create records on said operations.

16. The apparatus according to claim 14, further comprising a pre-processor unit for preparing the records data collected from said interface unit for said analyzer unit.

17. The apparatus according to claim 13, further comprising one or more units selected from a non-exhausting list comprising an actions unit, an operator panel unit and a rule builder unit configured to store and develop rules for detecting a fraud event.

18. A system for detecting a fraud event in a distributed telecommunications network, wherein the distributed network enables performance of at least two functions selected from a list comprising: an access function, a transport function, an application function, a management function and a security function by different respective functional groups of elements, at least two of the different functional groups having respectively different characteristics, and the at least two different functional groups each comprising at least one element capable of performing operations related to at least the function of said particular functional group and operative to create records on said operations, said system comprising:

a fraud detection apparatus capable of analyzing records data related to at least one telecommunications session and originating from at least two of the elements each belonging to a respective one of said at least two different functional groups to determine whether there is a lack of consistency between the records data parts respectively obtained from said at least two different functional groups and wherein the records data parts relate to the same at least one telecommunications session, and concluding that there is a fraud event if the lack of consistency is determined.

19. A program storage device readable by a machine, tangibly embodying a program of instructions executable by the machine to perform method steps, for detecting a fraud event in a distributed telecommunications network, wherein said steps being:

analyzing records data related to at least one telecommunications session and originating from at least two elements each belonging to a respective one of at least two different functional groups having respectively different characteristics to determine whether there is a lack of consistency between the records data parts respectively associated with said at least two functional groups and wherein the records data parts relate to the same at least one telecommunications session, and if the lack of consistency is determined, concluding that there is a fraud event.

20. A computer program product comprising a computer useable medium having computer readable program code embodied therein for detecting a fraud event in a distributed telecommunications network, the computer program product comprising:

a computer readable program code for causing the computer to analyze records data related to at least one telecommunications session and originating from at least two elements each belonging to a respective one of at least two different functional groups having respectively different characteristics, to determine whether there is a lack of consistency between the records data parts respectively associated with said at least two different functional groups and wherein the records data parts relate to the same at least one telecommunications session, and a computer readable program code for causing the computer, if the lack of consistency is determined, to conclude that there is a fraud event.

* * * * *